(12) United States Patent
Kashiwakura et al.

(10) Patent No.: US 10,422,040 B2
(45) Date of Patent: *Sep. 24, 2019

(54) ORGANIC RESIN-COVERED SURFACE-TREATED METAL SHEET

(71) Applicant: TOYO SEIKAN GROUP HOLDINGS, LTD., Tokyo (JP)

(72) Inventors: Takuya Kashiwakura, Yokohama (JP);
Yuji Funagi, Yokohama (JP);
Tomohiro Miyai, Yokohama (JP);
Arata Sakuragi, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 15/561,567

(22) PCT Filed: Mar. 28, 2016

(86) PCT No.: PCT/JP2016/059987
§ 371 (c)(1),
(2) Date: Sep. 26, 2017

(87) PCT Pub. No.: WO2016/158885
PCT Pub. Date: Oct. 6, 2016

(65) Prior Publication Data
US 2018/0087159 A1   Mar. 29, 2018

(30) Foreign Application Priority Data

Mar. 27, 2015  (JP) ................... 2015-066747
Dec. 1, 2015   (JP) ................... 2015-234811
(Continued)

(51) Int. Cl.
*C23C 22/56*      (2006.01)
*B32B 15/06*      (2006.01)
(Continued)

(52) U.S. Cl.
CPC ............ *C23C 22/56* (2013.01); *B32B 15/08* (2013.01); *B32B 15/082* (2013.01); *B65D 1/12* (2013.01);
(Continued)

(58) Field of Classification Search
CPC ......... C23C 22/56; C23C 28/00; B32B 15/08; B32B 15/082; B65D 1/12; B65D 25/34; C09D 5/32; C09D 7/00
(Continued)

(56) References Cited

U.S. PATENT DOCUMENTS 5,478,872 A * 12/1995 Yamasoe ............. C08L 71/02
                                                   524/221
6,565,937 B2    5/2003 Sato et al.
(Continued)

FOREIGN PATENT DOCUMENTS

CN   101595151 A   12/2009
CN   102918185 A   2/2013
(Continued)

OTHER PUBLICATIONS

International Search Report for PCT/JP2016/059987, dated May 24, 2016.
(Continued)

*Primary Examiner* — Michael Bernshteyn
(74) *Attorney, Agent, or Firm* — Sughrue Mion, PLLC

(57) ABSTRACT

An organic resin-covered surface-treated metal sheet having formed on at least one surface of a metal sheet a surface-treatment coating and an organic resin film on the surface-treatment coating. The surface-treatment coating contains a poly-carboxylic acid type polymer and a polyvalent metal compound. The surface-treatment coating measured for its infrared-ray absorption spectra has a peak height ratio ($\beta/\alpha$) of a maximum absorption peak height ($\alpha$) in a wave number
(Continued)

range of 1660 to 1760 cm$^{-1}$ and a maximum absorption peak height (β) in a wave number range of 1490 to 1659 cm$^{-1}$ of from 0.05 to 2.35.

12 Claims, 2 Drawing Sheets

(30) Foreign Application Priority Data

Dec. 16, 2015 (JP) ................................. 2015-245396
Feb. 3, 2016 (JP) ................................. 2016-018970

(51) Int. Cl.
    *C23C 28/00* (2006.01)
    *B65D 1/12* (2006.01)
    *B65D 25/34* (2006.01)
    *C09D 5/08* (2006.01)
    *C09D 5/32* (2006.01)
    *C09D 7/00* (2018.01)
    *B32B 15/08* (2006.01)
    *B32B 15/082* (2006.01)

(52) U.S. Cl.
    CPC ............... *B65D 25/34* (2013.01); *C09D 5/08* (2013.01); *C09D 5/32* (2013.01); *C09D 7/00* (2013.01); *C23C 28/00* (2013.01)

(58) Field of Classification Search
    USPC ............................................. 428/411, 411.1
    See application file for complete search history.

(56) References Cited

U.S. PATENT DOCUMENTS 8,349,419 B2    1/2013    Nishida et al.
2005/0056390 A1*  3/2005  Neivandt ............... C08B 30/14
                                            162/70
2005/0131162 A1   6/2005  Tanaka et al.
2010/0015449 A1   1/2010  Obu et al.
2010/0081001 A1   4/2010  Sander et al.
2011/0200825 A1   8/2011  Chakraborty et al.
2013/0052478 A1   2/2013  Kurokawa et al.
2015/0056390 A1*  2/2015  Miyai .................... C23C 22/34
                                            428/35.8
2016/0160055 A1   6/2016  Wasserfallen et al.
2018/0291232 A1*  10/2018  Kashiwakura ........... B65D 1/00

FOREIGN PATENT DOCUMENTS

| CN | 104220639 A | 12/2014 | |
| DE | 10-2007-015161 A1 | 10/2008 | |
| DE | 10-2007-057057 A1 | 5/2009 | |
| DE | 10-2014-213474 A1 | 1/2015 | |
| EP | 1241236 A2 * | 9/2002 | ......... C09D 133/066 |
| EP | 1 498 510 A2 | 1/2005 | |
| EP | 2 058 378 A1 | 5/2009 | |
| JP | 6-322552 A | 11/1994 | |
| JP | 2001-246695 A | 9/2001 | |
| JP | 2005-281863 A | 10/2005 | |
| JP | 2005281863 A * | 10/2005 | |
| JP | 2007-76012 A | 3/2007 | |
| JP | 2007-176072 A | 7/2007 | |
| JP | 2014-189809 A | 10/2014 | |

OTHER PUBLICATIONS

Communication dated Sep. 6, 2018 issued by the European Patent Office in European Patent Application No. 16772766.8.

* cited by examiner ic resin-covered surface-treated metal sheet for use in the production of can bodies

ORGANIC RESIN-COVERED SURFACE-TREATED METAL SHEET

This application is a National Stage of International Application No. PCT/JP2016/059987 filed Mar. 28, 2016, claiming priority based on Japanese Patent Application Nos. 2015-066747 filed Mar. 27, 2015, 2015-234811 filed Dec. 1, 2015, 2015-245396 filed Dec. 16, 2015, and 2016-018970 filed Feb. 3, 2016, the contents of all of which are incorporated herein by reference in their entirety.

TECHNICAL FIELD

This invention relates to an organic resin-covered surface-treated metal sheet for use in the production of can bodies such as beverage cans and can lids. More specifically, the invention relates to an organic resin-covered surface-treated metal sheet having excellent adaptability to producing cans, capable of providing can bodies having excellent hot water-resistant adhering property to withstand sterilization treatment after having been filled with the content as well as providing can lids having excellent adaptability to producing lids and hot water-resistant adhering property, further, having advantage in economy and exerting small load on the environment.

BACKGROUND ART

Organic resin-covered metal sheets obtained by covering metal sheets such as of aluminum with an organic resin have long been known as materials for producing cans. It has also been known to subject the above organic resin-covered metal sheets to the draw working or the draw-ironing working to produce seamless cans for containing beverages, or to subject the metal sheets to the press-forming to produce can lids such as easy-to-open ends. For example, an organic resin-covered metal sheet having, as an organic resin film, a thermoplastic resin film of a polyester resin comprising chiefly an ethylene terephthalate unit, has been widely used as a material for producing seamless cans (patent document 1).

Further, as a metal sheet used for the preparation of the organic resin-covered metal sheet that is used for producing can bodies and can lids, there is usually used a surface-treated metal sheet of which the surfaces are subjected to the surface treatment such as conversion treatment in order to impart corrosion resistance and close adhesion to the organic resin films. As the surface treatment, there can be exemplified a chromic phosphate process. Namely, the organic resin-covered surface-treated metal sheet comprising the surface-treated metal sheet after chromic phosphate process has been widely used for forming the seamless cans and the like owing to its excellent adaptability to producing cans and excellently adhering property (hot water-resistant adhering property) between the organic resin film and the metal base material during the sterilization treatment after the can has been filled with the content and has been sealed. From the standpoint of protecting the environment, however, it has now been increasingly demanded to treat the surfaces without using chromium.

So far, a number of chromium-free surface treatments have been proposed for materials for producing cans. For producing organic resin-covered seamless aluminum cans, for example, there has been proposed a conversion treatment of the organic/inorganic composite type using a zirconium compound, a phosphorous compound and a phenol compound providing excellent adaptability to producing cans and expressing hot water-resistant adhering property (patent document 2). However, the surface treatment proposed above is a surface treatment of the conversion type (reaction type) that requires the washing with water after the treatment. Namely, this surface treatment produces large quantities of waste water and requires cost for treating the waste water yet exerting large load on the environment.

For the materials for producing cans, on the other hand, there has also been proposed a chromium-free surface treatment of the application type (application type treatment) which, unlike the surface treatment of the conversion type, requires no washing with water after the treatment and, therefore, reduces the cost for treating the waste water and, besides, exerts reduced burden on the environment. For instance, there has been proposed a resin-coated aluminum sheet forming an application type underlying coating that contains a zirconium compound and a poly-acrylic acid crosslinked with zirconium (patent document 3).

PRIOR ART DOCUMENTS

Patent Documents

Patent document 1: JP-A-2001-246695
Patent document 2: JP-A-2007-76012
Patent document 3: JP-A-2007-176072

OUTLINE OF THE INVENTION

Problems that the Invention is to Solve

However, the application-type underlying film proposed by the above patent document 3 is, specifically, for a resin-coated aluminum sheet for forming caps, and may be suited for forming caps that do not require large amounts of working. If applied to the organic resin-covered metal sheet for producing seamless cans through severe working as compared to forming the caps, however, there occur problems as described below. That is, if the seamless cans are formed, the organic resin film often peels at the portions subjected to the treatment (necking or flanging) after the can bodies have been formed during the pasteurization treatment (with shower of hot water) after the cans have been filled with content and have been sealed or during the sterilization treatment such as retort treatment due to the lack of hot water-resistant adhering property between the organic resin film and the metal base material. Further, if the retort treatment is conducted by being pressurized and heated under more severe conditions in which the side wall of the can body on the outer surface side is partly in contact with water, the organic resin film often floats and swells (blisters), i.e., the surface becomes defective near the portion where the side wall of the can body on the outer surface side thereof is in contact with water due to lack of hot water-resistant adhering property between the organic resin film and the metal base material. Therefore, further improvements are necessary for applying the application type underlying coating to the organic resin-covered metal sheet for producing seamless cans.

It is, therefore, an object of the present invention to provide an organic resin-covered surface-treated metal sheet having a surface-treatment coating which is capable of suppressing the organic resin film from peeling at the flange portion even when it is exposed to high temperature-high humidity environment such as of the pasteurization treatment after the cans have been filled with the content and the retort treatment, the organic resin-covered surface-treated metal sheet further being capable of suppressing the generation of defects in the surface such as blistering even when subjected to the sterilization treatment under more severe conditions such as retort treatment in a state where the side wall of the can body on the outer surface side thereof is in contact with water, and, further, being advantageous in economy and being formed through the chromium-free application-type treatment that exerts small load on the environment.

Means for Solving the Problems

The present invention provides an organic resin-covered surface-treated metal sheet forming, on at least one surface of a metal sheet, a surface-treatment coating and an organic resin film on the surface-treatment coating, wherein:

the surface-treatment coating contains a poly-carboxylic acid type polymer and a polyvalent metal compound; and if the surface-treatment coating is measured for its infrared-ray absorption spectra, a peak height ratio ($\beta/\alpha$) of a maximum absorption peak height ($\alpha$) in a wave number range of 1660 to 1760 cm$^{-1}$ and a maximum absorption peak height ($\beta$) in a wave number range of 1490 to 1659 cm$^{-1}$ is from 0.05 to 2.35.

In the organic resin-covered surface-treated metal sheet of the present invention, it is desired that:
1. The peak height ratio ($\beta/\alpha$) is 0.75 to 1.48;
2. The poly-carboxylic acid type polymer is a polymer obtained by the polymerization of at least one kind of a polymerizable monomer selected from acrylic acid, methacrylic acid, itaconic acid and maleic acid, or a copolymer thereof, or a mixture thereof;
3. The polyvalent metal compound is at least the one selected from a zirconium compound, a titanium compound and a zinc compound;
4. The polyvalent metal compound is a zirconium compound derived from a water-soluble oxyzirconium salt;
5. The content of the poly-carboxylic acid type polymer in the surface-treatment coating is 12 to 100 mg/m$^2$ calculated as carbon, and the content of the polyvalent metal is 2 to 80 mg/m$^2$ calculated as metal;
6. The surface-treatment coating contains the polyvalent metal compound in an amount of 3 to 67 parts by weight calculated as metal per 100 parts by weight of the solid component of the poly-carboxylic acid type polymer;
7. The surface-treatment coating contains colloidal silica;
8. The content of the colloidal silica in the surface-treatment coating is 5 to 200 mg/m$^2$ calculated as silicon;
9. The organic resin film is a polyester resin film; and
10. The metal sheet is an aluminum sheet.

According to the present invention, further, there is provided a can body made from the above organic resin-covered surface-treated metal sheet.

The can body according to the present invention is, preferably, an organic resin-covered seamless can made from the above organic resin-covered surface-treated metal sheet, wherein if the surface-treatment coating of the organic resin-covered seamless can is measured for its infrared-ray absorption spectra, a peak height ratio ($\beta/\alpha$) of a maximum absorption peak height ($\alpha$) in a wave number range of 1660 to 1760 cm$^{-1}$ and a maximum absorption peak height ($\beta$) in a wave number range of 1490 to 1659 cm$^{-1}$ is from 0.10 to 2.35.

According to the present invention, there is, further, provided a can lid made from the above organic resin-covered surface-treated metal sheet.

According to the present invention, further, there is provided an organic resin-covered seamless can forming, on at least one surface of an aluminum base material, a surface-treatment coating and an organic resin film comprising a polyester resin film on the surface-treatment coating, wherein:

the surface-treatment coating contains a poly-carboxylic acid type polymer and a polyvalent metal compound; and if the surface-treatment coating is measured for its infrared-ray absorption spectra, a peak height ratio ($\beta/\alpha$) of a maximum absorption peak height ($\alpha$) in a wave number range of 1660 to 1760 cm$^{-1}$ and a maximum absorption peak height ($\beta$) in a wave number range of 1490 to 1659 cm$^{-1}$ is from 0.78 to 1.45.

Effects of the Invention

The present inventors have forwarded the study concerning the organic resin-covered surface-treated metal sheet forming, on at least one surface of a metal sheet, a surface-treatment coating which contains a poly-carboxylic acid type polymer such as poly-acrylic acid as a chief component and a polyvalent metal compound such as zirconium compound as a crosslinking component for the poly-carboxylic acid type polymer, and, further, forming an organic resin film on the surface-treatment coating. In this connection, the inventors have measured the surface-treatment coating for its infrared-ray absorption spectra that serve as a scale for measuring a ratio of the amount of the free carboxyl groups (—COOH) in the poly-carboxylic acid type polymer that is not forming a metal salt with the polyvalent metal and the amount of the carboxyl groups (—COO—) in the poly-carboxylic acid type polymer that is forming a metal salt with the polyvalent metal. The inventors have found that the hot water-resistant adhering property of the organic resin-covered seamless cans made from the organic resin-covered surface-treated metal sheet through severe working, are seriously affected by a peak height ratio ($\beta/\alpha$) of a maximum absorption peak height ($\alpha$) in a wave number range of 1660 to 1750 cm$^{-1}$ and a maximum absorption peak height ($\beta$) in a wave number range of 1490 to 1659 cm$^{-1}$, and by a crosslinking ratio defined from the above peak height ratio ($\beta/\alpha$) using a formula described later, which is a scale for measuring the ratio of all carboxyl groups contained in the poly-carboxylic acid type polymer. The inventors have, further, discovered optimum ranges that can be favorably applied for the materials for cans to withstand the sterilization treatment under pressurized and heated conditions, such as retort treatment.

It is thus made possible to provide an organic resin-covered surface-treated metal sheet for producing can bodies having excellent adaptability to making cans and hot water-resistant adhering property, and for producing can lids having excellent adaptability to making can lids and hot water-resistant adhering property.

Besides, the surface-treatment coating of the present invention is formed by the chromium-free application type treatment offering advantage in economy and exerting less load on the environment.

The above-mentioned actions and effects of the invention will also become obvious from the results of Examples described later.

Namely, the organic resin-covered surface-treated metal sheet is forming a surface-treatment coating that contains a poly-carboxylic acid type polymer such as poly-acrylic acid as a chief component and a polyvalent metal compound such as zirconium compound as a crosslinking component for the poly-carboxylic acid type polymer, and is, further, forming an organic resin film on the surface-treatment coating. Here, a seamless can is produced from the organic resin-covered surface-treated metal sheet that is forming the surface-treatment coating which if measured for its infrared ray-absorption spectra, a peak height ratio (β/α) of a maximum absorption peak height (α) in a wave number range of 1660 to 1750 cm$^{-1}$ and a maximum absorption peak height (β) in a wave number range of 1490 to 1659 cm$^{-1}$ is more than 2.35 (more than 70% in terms of the crosslinking ratio X). In this case, the organic resin film peels at the flange portion in the evaluation of peeling at the flange portion during the treatment with the hot water and in the evaluation of peeling at the flange portion during the retort treatment. In evaluating the appearance of the side wall of the can body during the retort treatment, further, the blistering is recognized (Comparative Example 3). If the seamless cans is produced by using the organic resin-covered surface-treated metal sheet having the surface-treatment coating whose peak height ratio (β/α) is less than 0.10 (less than 5% in terms of the crosslinking ratio X), the organic resin film peels at the flange portion in the evaluation of peeling at the flange portion during the retort treatment. Besides, occurrence of blistering is confirmed in the evaluation of appearance of the side wall of the can body during the retort treatment (Comparative Examples 1 and 2) If the seamless cans is produced by using the organic resin-covered surface-treated metal sheet having the surface-treatment coating whose peak height ratio (β/α) is in a range of 0.10 to 2.35 (5 to 70% in terms of the crosslinking ratio X), on the other hand, peeling of the organic resin film and blistering are suppressed in each of the evaluations, and it is obvious that the seamless cans possess excellent hot water-resistant adhering property.

If the seamless cans are produced by using the organic resin-covered surface-treated, metal sheet having the surface-treatment coating whose peak height ratio (β/α) is less than 0.05 (less than 5% in terms of the crosslinking ratio X), the organic resin film peels at the open end (flange-forming portion) of the can bodies in the evaluation of peeling at the flange portion during the heat treatment (in the evaluation of adaptability to producing cans) that is conducted presuming the step of heat treatment (step of heat-set) after the body wall has been formed (Comparative Examples 1 and 2). If the organic resin-covered surface-treated metal sheet having the surface-treatment coating whose peak height ratio (β/α) is not less than 0.05 (not less than 5% in terms of the crosslinking ratio), on the other hand, the organic resin film is suppressed from peeling and it is obvious that the organic resin-covered surface-treated metal sheet possesses excellent adaptability to producing cans.

Adaptability to producing cans is, further, improved if the surface-treatment coating of the present invention contains colloidal silica in addition to the above-mentioned poly-carboxylic acid type polymer and the polyvalent metal compound. In evaluating the peeling at the flange portion during the heat treatment, it will become obvious from the comparison of results of Examples 1, 24 and 25 that if the seamless cans are produced by using the organic resin-covered surface-treated metal sheet having the surface-treatment coating that contains the colloidal silica, the organic resin film is further suppressed from peeling in the flange-forming portion.

Figure 1:
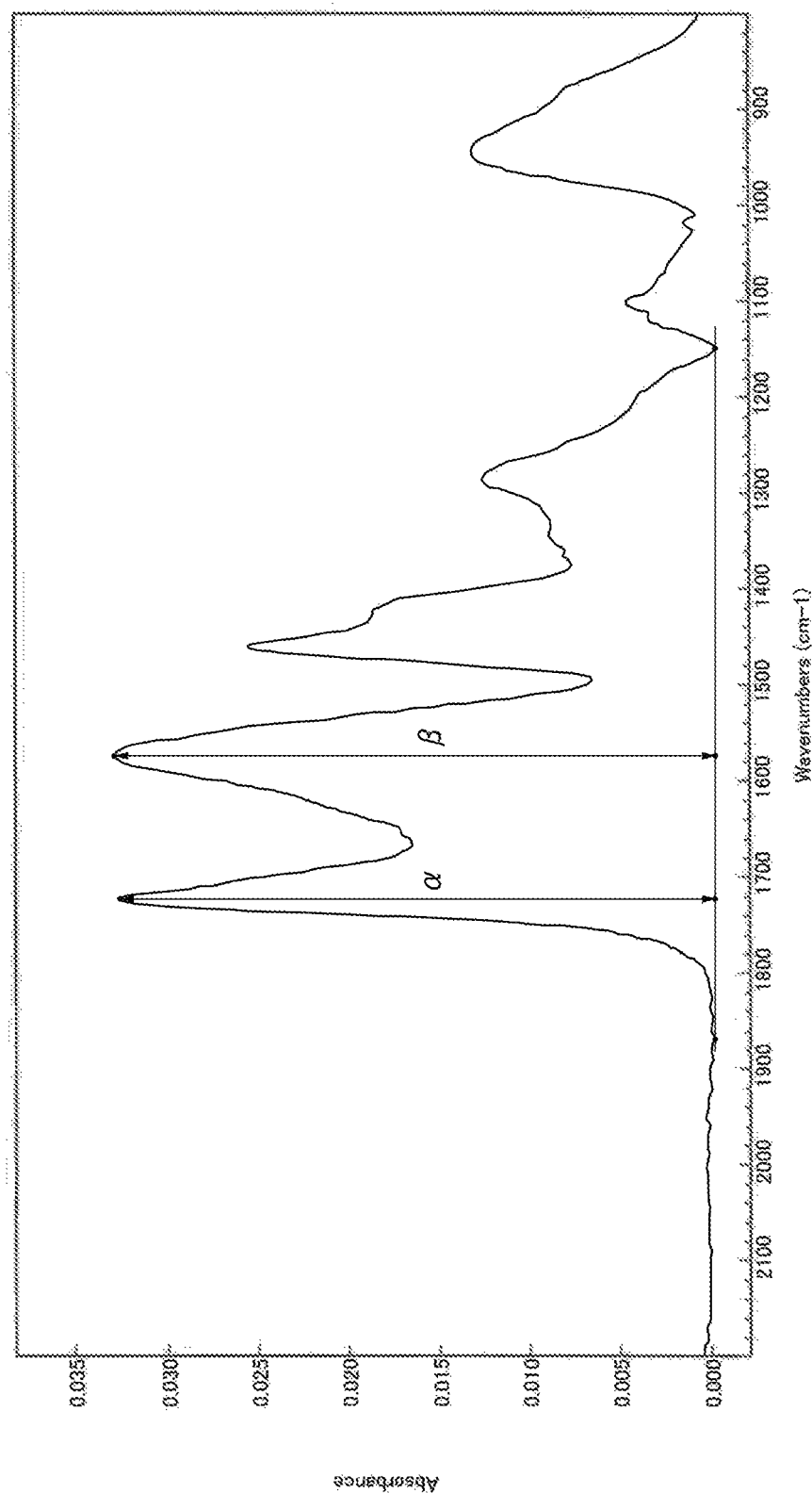
[FIG. 1] It is a diagram of infrared ray-absorption spectra of a surface-treatment coating in an organic resin-covered surface-treated metal sheet obtained in Example 1.

MODES FOR CARRYING OUT THE INVENTION (Surface Treatment Coating)

The surface-treatment coating in the organic resin-covered surface-treated metal sheet of the present invention contains at least a poly-carboxylic acid type polymer as the main component and a polyvalent metal compound as a crosslinking component for the poly-carboxylic acid type polymer. If the surface-treatment coating is measured for its infrared-ray absorption spectra, a peak height ratio (β/α) of a maximum absorption peak height (α) in a wave number range of 1660 to 1760 cm$^{-1}$ and a maximum absorption peak height (β) in a wave number range of 1490 to 1659 cm$^{-1}$ lies in a predetermined range and, besides, a crosslinking ratio found from the above peak height ratio as defined by the formula appearing later lies in a predetermined range. This is due to the reasons described below.

In the surface-treatment coating, if the polycarboxlic acid type polymer is crosslinked with the polyvalent metal compound, then the carboxyl group contained in the poly-carboxylic acid type polymer reacts with the polyvalent metal thereby forming a metal salt of the carboxyl group and the polyvalent metal.

In the measurement of infrared ray-absorption spectra, a free carboxyl group (—COOH) that is not forming a metal salt with the polyvalent metal exhibits an absorption peak due to a C=O expansion vibration of the carboxyl group having a maximum absorption near 1720 cm$^{-1}$ in a wave number range of 1660 to 1760 cm$^{-1}$ while a carboxyl group (—COO$^-$) that is forming a metal salt with the polyvalent metal exhibits an absorption peak due to a CαO expansion vibration of a metal salt of the carboxyl group having a maximum absorption near 1560 cm$^{-1}$ in a wave number range of 1490 to 1659 cm$^{-1}$. Absorbency of the surface-treatment coating varies in proportion to the amount of the chemical species having infrared activity that is present in the surface-treatment coating. Therefore, a peak height ratio (β/α) of a maximum absorption peak height (α) in a wave number range of 1660 to 1760 cm$^{-1}$ and a maximum absorption peak height (β) in a wave number range of 1490 to 1659 cm$^{-1}$, serves as a scale for measuring the ratio of the amount of the free carboxyl groups (—COOH) that are not forming a metal salt with the polyvalent metal and the amount of the carboxyl groups (—COO$^-$) that are forming a metal salt with the polyvalent metal in the carboxyl groups contained in the poly-carboxylic acid type polymer. The larger the value, the smaller the ratio of the free carboxyl groups (—COOH) while the larger the ratio of the carboxyl groups (—COO$^-$) that are forming the metal salt with the polyvalent metal.

Further, the crosslinking ratio referred to in the present invention represents a degree of crosslinking of the poly-carboxylic acid type polymer due to the polyvalent metal. That is, the crosslinking ratio is a scale of a ratio (mol %) of the carboxyl groups forming the metal salt with the poly-valent metal relative to all carboxyl groups (sum of the carboxyl groups that are not forming the metal salt with the polyvalent metal and the carboxyl groups forming the metal salt with the polyvalent metal) contained in the poly-carboxylic acid type polymer in the surface-treatment coating. In the present invention, a value X calculated from a maximum absorption peak height (α) in a wave number range of 1660 to 1760 cm$^{-1}$, a maximum absorption peak height ($\beta$) in a wave number range of 1490 to 1659 cm$^{-1}$ and a peak height ratio ($\beta/\alpha$) in compliance with the following formula (1), $$X(\%) = \{\beta/[\alpha + \beta]\} \times 100 \quad (1)$$
$$= \{(\beta/\alpha)/[1 + (\beta/\alpha)]\} \times 100$$

is defined to be a crosslinking ratio.

In the surface-treatment coating of the present invention, the peak height ratio ($\beta/\alpha$) is in a range of 0.05 to 2.35, preferably, 0.45 to 1.60, more preferably, 0.47 to 1.48 and, particularly preferably, 0.75 to 1.48. If expressed in terms of the crosslinking ratio, the crosslinking ratio is in a range of 5 to 70%, preferably, 30 to 62%, more preferably, 32 to 60% and, particularly preferably, 40 to 60%.

The actions and effects of the present invention are presumably exhibited as described below.

If the peak height ratio ($\beta/\alpha$) and the crosslinking ratio are in the above-mentioned ranges, the free carboxyl groups (carboxyl groups that are not forming the metal salt with the polyvalent metal) are sufficiently present in the surface-treatment coating, the surface-treatment coating and the organic resin film are favorably adhered to each other via the free carboxyl groups, and flexibility of the surface-treatment coating is maintained to a sufficient degree. Even when seamless cans are formed through severe working such as draw-ironing, therefore, the surface-treatment coating follows the metal base material. As a result, excellent hot water-resistant adhering property is realized preventing the organic resin film from peeling at the flange portion during the sterilization treatment and preventing the occurrence of defective appearance on the outer surface caused by blistering and the like. Moreover, heat resistance is greatly improved since the carboxyl groups contained in the poly-carboxylic acid type polymer are crosslinked with the polyvalent metal compound to a suitable degree. Therefore, even in a high-temperature environment such as in the step of heat set after the body wall has been formed, cohesive force is secured in the surface-treatment coating, the organic resin film is suppressed from peeling, and there is realized excellent adaptability to producing cans.

If the peak height ratio ($\beta/\alpha$) and the crosslinking ratio are larger than the above-mentioned ranges, the free carboxyl groups are present in small amounts in the surface-treatment coating, adhesiveness to the organic resin film decreases, and an excess degree of crosslinking causes the surface-treatment coating to be no longer capable of following the metal base material during the severe working often resulting in a great decrease in the hot water-resistant adhering property. If the peak height ratio ($\beta/\alpha$) and the crosslinking ratio are smaller than the above-mentioned ranges, on the other hand, the crosslinking does not take place to a sufficient degree, the surface-treatment coating lacks heat resistance and tends to undergo cohesive breakage in the step of heat set after the body wall has been formed. Therefore, the organic resin film may peel deteriorating the adaptability to producing cans. During the sterilization treatment, further, the crosslinking does not take place to a sufficient degree. Therefore, the surface-treatment coating lacks heat resistance and waterproof property, easily undergoes the cohesive breakage permitting the organic resin film to peel and often deteriorating the hot water-resistant adhering property.

It is desired that the surface-treatment coating in the organic resin-covered surface-treated metal sheet of the present invention contains the poly-carboxylic acid type polymer in an amount in a range of 12 to 100 mg/m$^2$ and, specifically, 21 to 50 mg/m$^2$ calculated as carbon and contains the polyvalent metal compound in an amount in a range of 2 to 80 mg/m$^2$ and, specifically, 4 to 40 mg/m$^2$ calculated as metal. If the amounts of the poly-carboxylic acid type polymer and the polyvalent metal compound are larger than the above ranges, it becomes difficult to adjust the peak height ratio and the crosslinking ratio to lie within the above-mentioned ranges, or the thickness of the film becomes unnecessary large causing disadvantage in economy. On the other hand, if the content of the poly-carboxylic acid type polymer or the polyvalent metal compound is smaller than the above-mentioned ranges, it becomes difficult to adjust the peak height ratio ($\beta/\alpha$) and the crosslinking ratio to lie within the above-mentioned ranges, or the thickness of the film becomes too small often making it difficult to attain a sufficient degree of hot water-resistant adhering property to the organic resin film.

If the colloidal silica is added, further, it is desired that the content of the colloidal silica in the surface-treatment coating is in a range of 5 to 200 mg/m$^2$ and, specifically, 10 to 100 mg/m$^2$ calculated as silicon. With the colloidal silica having excellent heat resistance being contained, the surface-treatment coating exhibits further improved heat resistance. Therefore the surface-treatment coating is suppressed from undergoing cohesive breakage in the step of heat set after the body wall has been formed. Namely, the organic resin film is suppressed from peeling, and improved applicability is realized for producing cans. If the content of the colloidal silica is smaller than the above range, the above-mentioned effects cannot be expected. Even if the content of the colloidal silica is larger than the above range, on the other hand, the effect cannot be expected any more but, rather, the hot water-resistant adhering property decreases relative to the organic resin film.

It is desired that the surface-treatment coating in the organic resin-covered surface-treated metal sheet of the invention contains the polyvalent metal compound in an amount, calculated as metal, in a range of 3 to 67 parts by mass, preferably, 18 to 52 parts by mass, more preferably, 18 to 48 parts by mass and, particularly preferably, 30 to 48 parts by mass per 100 parts by mass of the solid component of the poly-carboxylic acid type polymer. If the amount of the polyvalent metal compound is larger than, or smaller than, the above range, it often becomes difficult to adjust the peak height ratio and the crosslinking ratio to lie within the above-mentioned ranges, and desired effects may not often be obtained. Further, if the colloidal silica is contained in the surface-treatment coating, it is desired that the content of the colloidal silica is in a range of 10 to 200 parts by mass and, specifically, 50 to 200 parts by mass calculated as the solid component (silicon dioxide; SiO$_2$) per 100 parts by mass of the poly-carboxylic acid polymer. If the amount of the colloidal silica is smaller than the above range, sufficiently improved heat resistance cannot be expected. Even if the amount of the colloidal silica is larger than the above range, on the other hand, the heat resistance cannot be improved any more but, rather, the hot water-resistant adhering property is hindered relative to the organic resin film.

(Poly-Carboxylic Acid Type Polymer)

In the present invention, the existing poly-carboxylic acid type polymer can be used as the poly-carboxylic acid type polymer for constituting the surface-treatment coating. The existing poly-carboxylic acid type polymer is a generic term for the polymers that have not less than two carboxyl groups in the molecules thereof. Concrete examples include a homopolymer using the ethylenically unsaturated carboxylic acid as a polymerizable monomer; a copolymer of at least two kinds of ethylinically unsaturated carboxylic acids as monomer components, or a copolymer of ethylenically unsaturated carboxylic acids and other ethylenically unsaturated monomer; as well as acidic saccharides having a carboxyl group in the molecules thereof, such as alginic acid, carboxymethyl cellulose and pectin. These poly-carboxylic acid type polymers can be used each in a single kind or as a mixture of at least two kinds of the poly-carboxylic acid type polymers.

Here, representative examples of the ethylenically unsaturated carboxylic acid include acrylic acid, methacrylic acid, itaconic acid, maleic acid, fumaric acid and crotonic acid. Among them, acrylic acid, methacrylic acid, itaconic acid and maleic acid are preferred. As the ethylenically unsaturated monomer copolymerizable therewith, there can be representatively exemplified α-olefins such as ethylene, propylene and the like; vinyl carboxylate esters such as vinyl acetate and the like; unsaturated carboxylic acid esters such as alkyl acrylate, alkyl methacrylate and alkyl itaconate; and acrylonitrile, vinyl chloride, vinylidene chloride, vinyl fluoride, vinylidene fluoride, acrylamide and styrene.

If the poly-carboxylic acid type polymer is a copolymer of an ethylenically unsaturated carboxylic acid and vinyl carboxylate esters such as vinyl acetate, the poly-carboxylic acid type polymer is further saponified to transform the saturated vinyl carboxylate ester portions into a vinyl alcohol.

Among these polycarboxlic acid type polymers, it is desired to use polymers having a constituent unit derived from at least one kind of polymerizable monomer selected from acrylic acid, methacrylic acid, itaconic acid and maleic acid, or a mixture of the polymers thereof. The polymer may be a homopolymer or a copolymer. It is desired that the polymer contains the constituent unit in an amount of not less than 60 mol %, preferably, not less than 80 mol % and, most preferably, 100 mol %, the constituent unit being derived from at least one kind of polymerizable monomer selected from the acrylic acid, the maleic acid, the methacrylic acid and the itaconic acid (presuming the whole constituent unit to be 100 mol %). Namely, it is desired that the poly-carboxylic acid type polymer is a polymer comprising only at least one kind of the polymerizable monomer selected from the acrylic acid, the maleic acid, the methacrylic acid and the itaconic acid. Here, if a constituent unit other than the above constituent unit is included, the other constituent unit may be an ethylenically unsaturated monomer that is copolymerizable with, for example, the above-mentioned ethylenically unsaturated carboxylic acid. Further, if the poly-carboxylic acid type polymer is a polymer comprising only at least one kind of a polymerizable monomer selected from the acrylic acid, maleic acid, methacrylic acid and itaconic acid, it is allowable to use a homopolymer of the polymerizable monomer, a copolymer, or a mixture thereof. More preferably, it is allowable to use poly-acrylic acid, polymethacrylic acid, polyitaconic acid, polymaleic acid and a mixture thereof.

The carboxyl groups in the poly-carboxylic acid type polymer used in the present invention may have been partly neutralized with a basic compound in advance within a range in which the object of the invention is not impaired. As the basic compound, there can be exemplified hydroxides of alkali metals such as sodium hydroxide, potassium hydroxide and lithium hydroxide, and various amine compounds such as ammonia and the like.

It is desired that the poly-carboxylic acid type polymer that constitutes the surface-treatment coating of the invention, though not limited thereto only, has a weight average molecular weight (Mw) in a range of 3,000 to 1,000,000, preferably, 10,000 to 1,000,000 and, more preferably, 10,000 to 500,000. If the weight average molecular weight is smaller than the above range, the hot water-resistant adhering property of the surface-treatment coating may often be deteriorated. If the weight average molecular weight is larger than the above range, on the other hand, the surface-treating solution loses stability, may be gelled with the passage of time, and may often deteriorate the productivity.

(Polyvalent Metal Compounds)

The polyvalent metal compound that constitutes the surface-treatment coating of the present invention stands for a polyvalent metal atom simple substance having a valence of metal ions of not less than 2, and a compound thereof. Concrete examples of the polyvalent metal include alkaline earth metals such as beryllium, magnesium and calcium; transition metals such as titanium, zirconium, chromium, manganese, iron, cobalt, nickel, copper and zinc; and aluminum and the like. Concrete examples of the polyvalent metal compound include oxide, hydroxide, carbonate, organic acid salt and inorganic acid salt of the above polyvalent metals, as well as ammonium complexes of polyvalent metals, secondary to quaternary amine complexes of polyvalent metals, and carbonates and organic acid salts of these complexes. As the organic acid salt, there can be exemplified acetate, oxalate, citrate, lactate, stearate and ethylenically unsaturated carboxylate. As the inorganic acid salt, there can be exemplified chloride, sulfate, nitrate and phosphate. In addition to them, there can be exemplified organic metal compounds of polyvalent metals such as metal alkoxide compound, metal chelate compound and partly hydrolyzed products thereof. These polyvalent metal compounds can be used each in a single kind or as a mixture of at least two kinds of the polyvalent metal compounds.

In the present invention, among the above polyvalent metal compounds, there can be preferably used zirconium compound, titanium compound and zinc compound. Specifically, the zirconium compound is preferred.

(Zirconium Compounds)

As the zirconium compound used as the polyvalent metal compound for constituting the surface-treatment coating of the present invention, there can be used, for example, zirconium oxide, hexafluorozirconium acid ($H_2ZrF_6$), hexafluorozirconium potassium ($K_2ZrF_6$), hexafluorozirconium ammonium (($NH_4$)$_2ZrF_6$), ammonium zirconyl carbonate (($NH_4$)$_2ZrO(CO_3)_2$), zirconyl nitrate ($ZrO(NO_3)_2$), zirconyl acetate ($ZrO(C_2H_3O_2)_2$), zirconyl chloride ($ZrOCl_2$), zirconyl sulfate ($ZrOSO_4$), zirconyl carbonate ($ZrOCO_3$), zirconyl octylate ($ZrO(C_8H_{15}O_2)_2$), zirconyl hydroxide ($ZrO(OH)_2$), zirconyl hydroxide chloride ($ZrO(OH)Cl$), potassium zirconyl carbonate ($K_2(ZrO(CO_3)_2)$), zirconium phosphate, zirconium lactate, and zirconium acetylacetate [$Zr(OC(=CH_2)CH_2COCH_3)_4$]. Among the above zirconium compounds, preferred are those that contain no fluorine component from the standpoint of load on the environment, and, specifically, oxyzirconium salt. Here, the "oxyzirconium salt" stands for a salt that contains a positive divalent group (called zirconyl) expressed as ZrO. As the oxyzirconium salt, there can be exemplified ammonium zirconyl carbonate (($NH_4$)$_2ZrO(CO_3)_2$), zirconyl nitrate ($ZrO(NO_3)_2$) zirconyl acetate ($ZrO(C_2H_3O_2)_2$) zirconyl chloride (ZrOCl$_2$), zirconyl sulfate (ZrOSO$_4$), zirconyl carbonate (ZrOCO$_3$), ammonium zirconyl carbonate ((NH$_4$)$_2$ZrO(CO$_3$)$_2$), zirconyl hydroxide (ZrO(OH)$_2$), zirconyl hydroxide chloride (ZrO(OH)Cl), and potassium zirconyl carbonate (K$_2$(ZrO(CO$_3$)$_2$). Among them, the water-soluble oxyzirconium salt is preferred and, specifically, the ammonium zirconyl carbonate can be preferably used as a precursor from the standpoint of stability in the form of the treating solution and hot water-resistant adhering property.

If the water-soluble oxyzirconium salt (ammonium zirconyl carbonate) is used as the polyvalent metal compound (zirconium compound) that constitutes the surface-treatment coating of the organic resin-covered surface-treated metal sheet of the invention, it is desired that the surface-treatment coating contains the oxyzirconium salt in an amount, calculated as the zirconium oxide (ZrO$_2$), in a range of 5 to 90 parts by mass, preferably, 25 to 70 parts by mass, more preferably, 25 to 65 parts by mass and, specifically preferably, 40 to 65 parts by mass per 100 parts by mass of the poly-carboxylic acid type polymer.

(Titanium Compounds)

As the titanium compound used as the polyvalent metal for constituting the surface-treatment coating of the invention, there can be exemplified, though not limited thereto only, titanium oxide, titanium nitrate, titanium sulfate (Ti(SO$_4$)$_2$), titanium oxysulfate (TiOSO$_4$), titanium fluoride, hexafluorotitanate (H$_2$TiF$_6$), ammonium hexafluorotitanate ((NH$_4$)$_2$TiF$_6$), titanium lactate, titanium triethanolaminate, titanium aminoethylaminoethanolate, titanium diethanolaminate, diisopropoxytitanium bisacetone and titanium acetylacetonate. The invention favorably uses water-soluble organotitanium compounds such as titanium triethanolaminate and titanium lactate.

(Zinc Compounds)

As the zinc compound used as the polyvalent metal for constituting the surface-treatment coating of the invention, there can be exemplified, though not limited thereto only, oxide, hydroxide, carbonate, formate, acetate, oxalate, citrate, lactate, chloride, sulfate, nitrate and phosphate of zinc. Among these zinc compounds, it is desired to use the zinc oxide. If the zinc oxide is used, the form thereof may be either granular or non-granular but is, preferably, granular. Further, though there is no specific limitation, the particles have an average grain size of, preferably, not more than 50 μm, more preferably, not more than 10 μm and, particularly preferably, not more than 1 μm.

(Colloidal Silica)

As the colloidal silica for constituting the surface-treatment coating of the invention, there can be exemplified, though not limited thereto only, spherical silica such as LUDOX (produced by W.R. Grace Co.), SNOWTEX N and SNOWTEX UP (produced by Nissan Chemical Industries Ltd.). The colloidal silica has a grain size, desirably, in a range of 2 to 80 nm and, specifically, 4 to 30 nm. The particles having a size smaller than the above range are, usually, not easily available. The particles having a size larger than the above range, on the other hand, cannot be homogeneously distributed in the surface-treatment coating and the effects cannot be obtained as desired.

The surface-treatment coating in the invention can be used by adding thereto, or containing therein, a metal compound of a monovalent alkali in amounts in a range in which the object of the invention is not impaired. The monovalent alkali metal compound is added in an amount of not more than 0.2 chemical equivalents relative to the carboxyl groups in the poly-carboxylic acid type polymer from the standpoint of hot water-resistant adhering property.

The monovalent metal compound may be partly contained in the molecules of the polyvalent metal salt of the poly-carboxylic acid type polymer.

Further, the surface-treatment coating of the invention may contain a water-soluble polymer such as polyvinyl alcohol, ethylene-vinyl alcohol copolymer, polyvinyl pyrrolidone, polyvinylethyl ether, polyacrylamide, acrylamide type compound, polyethyleneimine, starch, water-soluble polymers such as gum Arabic or methyl cellulose, and a high molecular compound such as polyvinylacetate, ethylene•vinyl acetate copolymer, polyester resin or polyurethane resin.

[Calculating the Peak Height Ratios (β/α)]

Described below is how to calculate the peak height ratio (β/α) of the surface-treatment coating based on the measurement of the infrared ray-absorption spectra mentioned above. First, the surface-treatment coating is measured in a customary manner for its infrared ray-absorption spectra over a wave number range of 4000 to 700 cm$^{-1}$, and absorption peaks due to the water vapor and the carbonic acid gas are subtracted from the obtained infrared ray-absorption spectra of the surface-treatment coating. Thereafter, as shown in FIG. 1, there are obtained a maximum absorption peak height (α) in a wave number range of 1660 to 1760 cm$^{-1}$ in the infrared ray absorption spectra and a maximum absorption peak height (β) in a wave number range of 1490 to 1659 cm$^{-1}$, and from which a peak height ratio (β/α) is calculated. Here, the maximum absorption peak height (α) in the wave number range of 1660 to 1760 cm$^{-1}$ in the infrared ray absorption spectra and the maximum absorption peak height (β) in the wave number range of 1490 to 1659 cm$^{-1}$ are defined as described below.

Maximum Peak Height (α):

A straight line connecting a point where the absorbency is a minimum in the wave number range of 1800 to 2000 cm$^{-1}$ to a point where the absorbency is a minimum in the wave number range of 1000 to 1200 cm$^{-1}$ is regarded to be a base line. A straight line is drawn perpendicularly to the abscissa (wave number) from a vertex of the maximum absorption peak in the wave number range of 1660 to 1760 cm$^{-1}$. A difference between the absorbency at a point where the straight line intersects the base line and the absorbency at the vertex of the maximum absorption peak is regarded to be a maximum peak height (α).

Maximum Peak Height (β):

A straight line connecting a point where the absorbency is a minimum in the wave number range of 1800 to 2000 cm$^{-1}$ to a point where the absorbency is a minimum in the wave number range of 1000 to 1200 cm$^{-1}$ is regarded to be a base line. A straight line is drawn perpendicularly to the abscissa (wave number) from a vertex of a maximum absorption peak in the wave number range of 1490 to 1659 cm$^{-1}$. A difference between the absorbency at a point where the straight line intersects the base line and the absorbency at the vertex of the maximum absorption peak is regarded to be a maximum peak height (β).

Further, if the poly-carboxylic acid type polymer used in the present invention is a copolymer of an ethylenically unsaturated carboxylic acid and other unsaturated carboxylic acid ester such as alkyl acrylate or alkyl methacrylate, or a mixture of a polymer of the ethylenically unsaturated carboxylic acid and a polymer of the unsaturated carboxylic acid ester, or is a copolymer of the ethylenically unsaturated carboxylic acid and a vinyl carboxylate ester or a mixture of a polymer of the ethylenically unsaturated carboxylic acid and a polymer of the vinyl carboxylate ester, the C=O expansion vibration that attributes to the ester bond (—COOR:R is an alkyl group) of the carboxylic acid ester imparts an absorption peak having a maximum absorption in a wave number range of 1730 cm$^{-1}$ to 1750 cm$^{-1}$. Strictly speaking, therefore, two C=O expansion vibrations due to the carboxyl group (—COOH) and the ester bond (—COO—R) are often included in the maximum absorption peak in the wave number range of 1660 to 1760 cm$^{-1}$ in the infrared ray-absorption spectra of the copolymers thereof or the mixtures thereof. In this case, too, the peak height ratio (β/α) calculated according to the above-mentioned procedure is directly used as a scale for indicating the ratio of the amount of the free carboxyl groups (—COOH) that are not forming the metal salt with the polyvalent metal and the amount of the carboxyl groups (—COO$^-$) that are forming the metal salt with the polyvalent metal. Further, in the case when the surface-treatment coating contains the compound or the polymer having an ester bond, too, the peak height ratio (β/α) calculated according to the above-mentioned procedure is directly used as a scale for indicating the ratio of the amount of the free carboxyl groups (—COOH) that are not forming the metal salt with the polyvalent metal and the amount of the carboxyl groups (—COO$^-$) that are forming the metal salt with the polyvalent metal within a range in which the object of the present invention is not impaired.

On the other hand, if the surface-treatment coating contains an alkali metal such as sodium or potassium (e.g., being mixed with, or containing, an alkali metal salt of the poly-carboxylic acid type polymer) within a range in which the object of the invention is not impaired, the C=O expansion vibration attributed to a monovalent metal salt (—COO$^-$) of the carboxyl group and the alkali metal imparts an absorption peak having a maximum absorption near 1560 cm$^{-1}$ in the wave number range of 1490 to 1659 cm$^{-1}$. Strictly speaking, therefore, a C=O expansion vibration due to a monovalent metal salt of the carboxyl group and the alkali metal is included in the C=O expansion vibration due to the metal salt of the carboxyl group and the polyvalent metal in the peak in the infrared ray-absorption spectra. In this case, too, the peak height ratio (β/α) calculated according to the above-mentioned procedure is directly used as a scale for indicating the ratio of the amount of the free carboxyl groups (—COOH) that are not forming the metal salt with the polyvalent metal and the amount of the carboxyl groups (—COO$^-$) that are forming the metal salt with the polyvalent metal.

The infrared ray-absorption spectra of the surface-treatment coating are measured, desirably, by a high sensitivity reflection method (reflective absorption method) that is capable of highly sensitively measuring the infrared ray-absorption spectra of a thin film formed chiefly on a metal base material. It is desired to use a polarizer for the measurement. By using the polarizer, the parallel polarization (P-polarization) only can be detected, and the measurement can be taken highly sensitively. Here, however, use of the polarizer decreases the quantity of infrared rays that can be used for the measurement and hence increases the noise. As a detector for the measurement, therefore, it is desired to use a semiconductor type mercury cadmium telluride (MCT) detector. As the reference substrate for the measurement, further, it is desired to use a gold-deposited mirror.

(Surface-Treating Solution)

The surface-treating solution used for forming the surface-treatment coating of the present invention contains a poly-carboylic acid type polymer, a polyvalent metal compound, an aqueous medium and, as required, colloidal silica.

The surface-treating solution desirably contains the polyvalent metal compound in an amount in a range of 3 to 67 parts by mass, preferably, 18 to 52 parts by mass, more preferably, 18 to 48 parts by mass and, particularly preferably, 30 to 48 parts by mass calculated as metal per 100 parts by mass of the solid component of the poly-carboxylic acid type polymer. If the polyvalent metal compound is the above-mentioned oxyzirconium salt, the surface-treating solution contains the oxyzirconium salt in an amount in a range of 5 to 90 parts by mass, preferably, 25 to 70 parts by mass, more preferably, 25 to 65 parts by mass and, particularly preferably, 40 to 65 parts by mass calculated as zirconium oxide ($ZrO_2$) per 100 parts by mass of the poly-carboxylic acid type polymer.

If the surface-treating solution is blended with the colloidal silica, further, it is desired that the colloidal silica is added in an amount of 10 to 200 parts by mass and, specifically, 50 to 200 parts by mass calculated as the solid component thereof (silicon dioxide; $SiO_2$) per 100 parts by mass of the poly-carboxylic acid type polymer. If the amount of the colloidal silica is smaller than the above range, sufficiently improved heat resistance is not expected. Even if the amount of the colloidal silica is larger than the above range, on the other hand, the heat resistance is not improved any more but rather the hot water-resistant adhering property property is impaired relative to the organic resin film.

As the aqueous medium, there can be used water such as distilled water, deionized water or pure water. Like the known aqueous composition, the aqueous medium can contain an organic solvent such as alcohol, polyhydric alcohol or derivatives thereof. If such a cosolvent is contained, then the amount thereof will be 5 to 30% by weight relative to the water. The film performance improves if the solvent is contained in the above range. As the organic solvent, there can be exemplified methyl alcohol, ethyl alcohol, isopropyl alcohol, propylene glycol monopropyl ether, ethylene glycol monobutylether, propylene glycol monomethyl ether, propylene glycol monobutyl ether, dipropylene glycol monomethyl ether, dipropylene glycol monobutyl ether, tripropylene glycol monomethyl ether, and 3-methyl-3-methoxybutal.

(Method of Forming the Surface-Treatment Coating on the Metal Sheet)

There is no particular limitation on the method of forming the surface-treatment coating on the metal sheet. As the treatment (pretreatment) for washing the surface of the metal sheet to remove the rolling oil and the anti-rust oil, the metal sheet is subjected to the dewaxing treatment, washed with water and is adjusted for its surfaces. Next, the surface-treating solution is applied onto the metal sheet followed by heating and drying to form the surface-treating layer.

There is no particular limitation on the dewaxing treatment, and there can be exemplified the washing with an alkali or the washing with an acid that was so far used for dewaxing the metal sheets such as of aluminum and aluminum alloys. In the present invention, it is desired to carry out the washing with the alkali and then with the acid, or to carry out the washing with the acid without, however, carrying out the washing with the alkali from the standpoint of close adhesion between the surface-treatment coating and the metal base material. In carrying out the dewaxing treatment, in general, the washing with the alkali is carried out by using an alkaline cleaner and the washing with the acid is carried out by using an acidic cleaner.

There is no particular limitation on the alkaline cleaner. For example, there can be used the one that is usually used for the washing with the alkali, such as "Surf-Cleaner 420N-2" manufactured by Nihon Paint Co. There is no particular limitation on the acidic cleaner, and there can be used aqueous solutions of inorganic acids such as sulfuric acid, nitric acid and hydrochloric acid. After the dewaxing treatment is conducted, the washing with water is carried out to remove the dewaxing agent remaining on the surface of the metal sheet. Thereafter, water is removed from the surface of the metal sheet by blowing the air or by drying with the hot air.

The surface-treating solution is applied onto the metal sheet by a conventional method such as roll-coating method, spraying method, dipping method, application using a brush, spray-squeezing method (the surface-treating solution is applied by being sprayed onto the metal sheet and, thereafter, the liquid film is squeezed and dried by using the rolls or the air), dip-squeezing method (the metal sheet is dipped in the surface-treating liquid and, thereafter, the liquid film is strongly squeezed and dried by using the rolls or the air). The surface-treating solution is dried under the conditions of 50 to 300° C. for 5 seconds to 5 minutes and, specifically, 50 to 250° C. for 10 seconds to 2 minutes.

(Metal Sheets)

As the metal sheet for use in the present invention, though there is no particular limitation, there can be used various steel sheets and aluminum sheets. As the steel sheet, there can be used the one that is obtained by annealing a cold-rolled steel sheet and, thereafter, subjecting it to the secondary cold rolling. There can be, further, used a clad steel sheet. As the aluminum sheet, there can be used the so-called pure aluminum sheet as well as an aluminum sheet comprising an aluminum alloy. In the invention, the aluminum sheet comprising the aluminum alloy is particularly preferably used.

As the aluminum sheet, there is preferably used, for example, aluminum alloy 5182, aluminum alloy 5021, aluminum alloy 5022, aluminum alloy 5052, aluminum alloy 3004, aluminum alloy 3005, aluminum alloy 3104 or aluminum alloy 1100.

The initial thickness of the metal sheet is not specifically limited and varies depending on the kind of the metal and use or size of the containers. The metal sheet, however, should have a thickness of, usually, 0.10 to 0.50 mm. Specifically, the steel sheet should have a thickness of 0.10 to 0.30 mm and the aluminum sheet should have a thickness of 0.15 to 0.40 mm. If the thickness is less than 0.15 mm, the lid is formed with difficulty and without having desired strength. On the other hand, the thickness in excess of 0.40 mm becomes disadvantageous in economy.

In the invention, the metal sheet may be the one that has been subjected, in advance, to the conventional conversion treatment or the surface treatment such as plating.

If a steel sheet is used as the metal sheet, the surface treatment may comprise one, two or more kinds of surface treatments such as zinc plating, tin plating, nickel plating, electrolytic chromate treatment, chromate treatment and phosphate treatment. If an aluminum sheet is used as the metal sheet, the surface treatment may comprise an inorganic conversion treatment such as chromic-phosphate process, treatment with zirconium-phosphate process or phosphate process; an organic/inorganic composite conversion treatment based on a combination of the inorganic conversion treatment with a water-soluble resin such as acrylic resin or phenol resin, or an organic component such as tannic acid.

(Organic Resin Films)

In the organic resin-covered metal sheet of the invention, there is no specific limitation on the organic resin that constitutes the organic resin film that is directly applied onto the surface-treatment coating formed on the metal sheet. As the organic resin, there can be exemplified thermoplastic resins, i.e., polyolefins such as crystalline polypropylene, crystalline propylene-ethylene copolymer, crystalline polybutene-1, crystalline poly 4-methylpentene-1, low-, intermediate- or high-density polyethylene, ethylene-vinyl acetate copolymer (EVA), ethylene-ethyl acrylate copolymer (EEA) and ionically crosslinked olefin copolymer (ionomer); aromatic vinyl copolymers such as polystyrene and styrene-butadiene copolymer; halogenated vinyl polymers such as polyvinyl chloride and vinylidene chloride resin; nitrile polymers such as acrylonitrile-styrene copolymer and acrylonitrile-styrene-butadiene copolymer; polyamides such as nylon 6, nylon 66, para- or metaxyleneadipamide; polyesters such as polyethylene terephthalate (PET) and polytetramethylene terephthalate; polycarbonates; and polyacetals such as polyoxymethylene. A thermoplastic resin film constituted by these thermoplastic resins can be used as the organic resin film. Among them, it is particularly desired to use the polyester resin film constituted by a polyester resin as the thermoplastic resin.

As the polyester resin for forming the polyester resin film, there can be used a homopolyethylene terephthalate or a simple copolymerized polyester that contains acid components other than the terephthalic acid in an amount of not more than 30 mol % based on the acid components or that contains alcohol components other than the ethylene glycol in an amount of not more than 30 mol % based on the alcohol components, or there can be used a blend thereof.

As the acid components other than the terephthalic acid, there can be exemplified isophthalic acid, naphthalenedicarboxylic acid, cyclohexanedicarboxylic acid, P-β-oxyethoxybenzoic acid, diphenoxyethane-4,4'-dicarboxylic acid, 5-sodiumsulfoisophthalic acid, hexahydroterephthalic acid, succinic acid, adipic acid, sebacic acid, dodecanedioic acid, dimeric acid, trimellitic acid and pyromellitic acid.

As the alcohol components other than the ethylene glycol, there can be exemplified glycol components such as propylene glycol, 1,4-butanediol, neopentyl glycol, 1,6-hexylene glycol, diethylene glycol, triethylene glycol, cyclohexanedimethanol, ethylene oxide adduct of bisphenol A, trimethyolpropane and pentaerythritol.

It is, further, allowable to use a resin obtained by blending a copolymerized polyester resin that chiefly comprises a homopolyethylene terephthalate resin and/or a polyethylene terephthalate with other crystalline polyester resin such as homopolybutylene terephthalate resin and/or a polybutylene terephthalate resin, or with a copolymerized polyester resin that chiefly comprises a homopolyethylene naphthalate resin and/or a polyethylene naphthalate resin. In this case, with the respect to the copolymerized polyester resin that chiefly comprises the homopolethylene terephthalate resin and/or the polyethylene terephthalate resin, the crystalline polyester resin which is other than the copolymerized polyester resin that chiefly comprises the homopolyethylene terephthalate resin and the polyethylene terephthalate resin is blended with 5 to 50 wt %.

Among the above polyester resins, it is desired to use any one of a polyethylene terephthalate resin comprising an ethylene terephthalate unit, a polyethylene terephthalate/polyethylene isophthalate copolymer resin, a polyethylene terephthalate/polybutylene terephthalate copolymer resin, a polyethylene terephthalate/polyethylene naphthalate copolymer resin, a blend of the polyethylene terephthalate resin and the polybutylene terephthalate resin, or a blend of the polyethylene terephthalate/polyethylene isophthalate copolymer resin and the polybutylene terephthalate resin. Specifically, it is desired to use the polyethylene terephthalate/polyethylene isophthalate copolymer resin, or the blend of the polyethylene terephthalate/polyethylene isophthalate copolymer resin and the polybutylene terephthalate resin. Here, it is desired that the polyethylene terephthalate/polyethylene isophthalate copolymer resin contains the isophthalic acid in an amount of not more than 20 mol % (based on the acid component). The blend of the polyethylene terephthalate/polyethylene isophthalate copolymer resin and the polybutylene terephthalate resin, is desirably the one that is blended with the polybutylene terephthalate resin in an amount in a range of 10 to 50 wt % per the polyethylene terephthalate/polyethylene isophthalate copolymer resin.

The polyester resin used as the organic resin film should have a molecular weight in a range in which a film can be formed, should have an intrinsic viscosity [η] of not less than 0.5 and, specifically, in a range of 0.52 to 0.70 as measured by using a phenol/tetrachloroethane mixed solvent from the standpoint of barrier property against corrosive components and mechanical properties, and should further have a glass transition point of not lower than 50° C. and, specifically, in a range of 60° C. to 80° C.

The thermoplastic resin film such as the polyester resin film can be blended with known blending agents for films, such as lubricant, antiblocking agent, pigment, various antistatic agents and antioxidant according to known recipe.

It is desired that the thermoplastic resin film such as the polyester resin film has a thickness, usually, in a range of 5 to 40 μm.

The organic resin film comprising the thermoplastic resin film can be constituted in a two-layer form. If a polyester resin is used as the thermoplastic resin, the lower layer is desirably formed by using the polyester resin that chiefly comprises the ethylene terephthalate unit and contains at least one of isophthalic acid or naphthalenedicarboxylic acid in an amount of 1 to 30 mol % (based on the acid component), the amount of the acid component therein being larger than that in the polyester resin forming the upper layer from the standpoint of close adhesion during the working and dent resistance.

The organic resin film comprising the thermoplastic resin film may be formed on the surface-treatment coating via a known adhesive primer layer of the epoxy-phenolic type or the polyester-phenolic type. The adhesive primer layer exhibits excellently adhering property to both the surface-treatment coating and the organic resin film.

The adhesive primer of the epoxy-phenolic type comprises a coating material that contains the epoxy resin and the phenol resin at a weight ratio of 50:50 to 99:1 and, specifically, at a weight of 60:40 to 95:5 from the standpoint of closely adhering property and corrosion resistance.

The adhesive primer of the polyesterphenol type comprises a coating material that contains the polyester resin and the phenol resin at a weight ratio of 50:50 to 99:1 and, specifically, at a weight of 60:40 to 95:5 from the standpoint of closely adhering property and corrosion resistance.

The adhesive primer layer is formed in a thickness of, usually, 0.1 to 10 μm. The adhesive primer layer may be formed in advance on the surface-treatment coating on the surface-treated metal sheet or may be formed on the organic resin film such as the above-mentioned polyester resin film.

In the organic resin-covered surface-treated metal sheet of the invention, a coating comprising a resin coating composition can be used as the organic resin film film. The resin coating composition that can be favorably used may be a thermosetting resin coating material that uses, for example, phenol resin, melamine resin, alkyd resin, unsaturated polyester resin, epoxy resin, epoxyacrylic resin, epoxyphenol resin, epoxyurea resin, bismaleimide resin, triallylcyanulate resin, thermosetting acrylic resin, silicone resin or oily resin, or a thermoplastic resin coating material that uses, for example, vinyl organosol, vinyl chloride-vinyl acetate copolymer, partly saponified product of vinyl chloride-vinyl acetate copolymer, vinyl chloride-maleic acid copolymer, vinyl chloride-maleic acid-vinyl acetate copolymer, acrylic polymer or saturated polyester resin. These resin coating materials are used alone or in a combination of two or more kinds. It is desired to form a coating of a resin coating material that includes, among them, one or two or more kinds of polyester resin, phenol resin, epoxy resin, epoxyacrylic resin, epoxyphenol resin, epoxyurea resin and vinyl organosol.

The coating has a dry mass of, desirably from 5 to 200 mg/dm$^2$.

(Forming the Organic Resin Film on the Surface-Treated Metal Sheet)

The organic resin film that is in the form of a thermoplastic resin film can be formed on the metal sheet as described below. Namely, the thermoplastic resin film is formed in advance by a known method and is applied onto the surface-treated metal sheet by the thermal adhesion method. Or the thermoplastic resin that is heated and melted is extruded by an extruder into a film and is applied directly onto the surface-treated metal sheet by the extrusion-lamination method. Further, if the thermoplastic resin film is formed and is, thereafter, applied, the film may have been stretched but, desirably, has not been stretched yet from the standpoint of formability and dent resistance.

The organic resin film that is in the form of a coating can be formed by applying a coating composition onto the surface-treated sheet by a conventional method such as roll-coating method, spraying method or the like method, followed by drying and firing.

Figure 2:
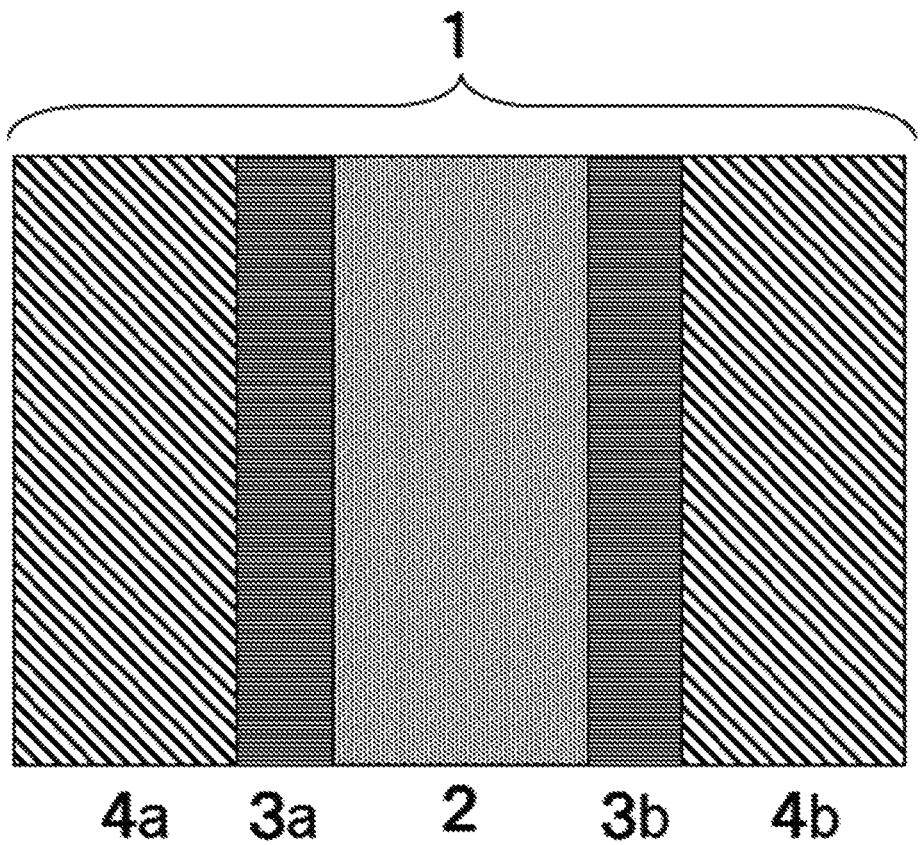
[FIG. 2] It is a view of an example of a structure in cross section of the organic resin-covered surface-treated metal sheet of the present invention.

FIG. 2 is a view of a structure in cross section of the organic resin-covered surface-treated metal sheet of the present invention. The organic resin-covered surface-treated metal sheet 1 includes surface-treatment coatings 3a and 3b formed on both surfaces of a metal sheet 2, and organic resin films 4a and 4b. In the concrete example shown in FIG. 2, the organic resin films 4a and 4b are formed on both the inner and outer surfaces of a container of the metal sheet 2 via the surface-treatment coatings 3a and 3b. In the organic resin-covered surface-treated metal sheet of the invention, however, the surface-treatment coating 3 and the organic resin film 4 may be formed on at least one surface. On the other surface, there may be formed different surface-treatment coating and organic resin film.

(Can Body and Method of its Production)

The can body comprising the organic resin-covered surface-treated metal sheet of the invention can be produced by a conventional method of forming.

The organic resin-covered surface-treated metal sheet of the invention features excellent adhesion due to the organic resin film during the working, and can be formed into a seamless can through a severe working such as draw working, draw-deep draw working, draw-ironing working, or draw-bend-elongation-ironing working without causing breakage in the can wall or peeling of the resin coating in the flange-forming portion.

Through the bend-elongation or, further, through the ironing working in the draw-redraw working of the organic resin-covered surface-treated metal sheet, it is desired that the side wall of the seamless can assumes a thickness which is reduced down to 20 to 95% and, specifically 25 to 85% of the initial thickness of the organic resin-covered surface-treated metal sheet.

The seamless can that is obtained is subjected to at least one stage of the heat treatment to remove residual strain in the film caused by the working, to volatilize, from the surface, the lubricant used for the working and, further, to dry and cure the inks printed on the surface. The container after heat-treated is quickly cooled or is left to cool and is, thereafter, subjected, as desired, to one stage or a multiplicity of stages of necking followed by flanging to obtain a can for wrap-seaming. After the seamless can has been formed, further, it is allowable to deform the upper part of the seamless can into the shape of a bottle.

(Can Lid and Method of its Production)

The can lid comprising the organic resin-covered surface-treated metal sheet of the invention can be formed by a conventional method of forming can lids.

As the organic resin-covered surface-treated metal sheet suited for forming the can lids, there can be exemplified, specifically, an organic resin-covered surface-treated metal sheet forming thereon a polyester resin film as the organic resin film via an adhesive primer layer of the epoxyphenol type or the polyesterphenol type. It is desired that the adhesive primer layer is formed in a dry thickness of 0.3 to 3 μm.

It is also desired to use an organic resin-covered surface-treated metal sheet forming, as the organic resin film, a coating by using an epoxyphenol type coating material, epoxyacrylic type coating material, polyester type coating material, epoxyurea type coating material or vinyl organosol type coating material. It is desired that the dry masses of these coatings are 10 to 160 mg/dm² in the case of a coating formed by using the epoxyacrylic type coating material, 30 to 140 mg/dm² in the case of a coating formed by using the epoxyphenol type coating material or the polyester type coating material, 30 to 70 mg/dm² in the case of a coating formed by using the epoxyurea type coating material, and 30 to 160 mg/dm² in the case of a coating formed by using the vinylorganosol type coating material.

The can lid may assume a conventional shape such as of easy-open ends having a score that forms an opening for pouring out the content and a tab for opening. Namely, the can lid may be either the full-open type or the partial-open type (tab stay-on type).

To form the easy-open lid, first, the organic resin-covered metal sheet is punched into the shape of a disc in the step of press-forming to thereby form the lid of a desired shape. Next, by using a score dies in the step of engraving the score, the score is engraved in the lid from the outer surface side thereof such that the score reaches half the thickness of the metal blank. By using a rivet-forming dies in the step of forming the rivet, a protruding rivet is formed at a portion that becomes the opening as sectionalized by the score. In the step of attaching the tab, a tab for opening is fitted to the rivet, and the tab is fixed by the protruding part of the rivet to thereby form an easy-open lid.

EXAMPLES

The present invention will now be described in detail by way of concrete Examples to which only, however, the invention is in no way limited. In the following description, "parts" are "parts by mass".

Examples 1 to 29 and Comparative Examples 1 to 3

(Preparation of Surface-Treating Solutions)

A poly-carboxylic acid type polymer was dissolved in the deionized water to obtain an aqueous solution containing 2% by mass of the poly-carboxylic acid type polymer. To the thus obtained poly-carboxylic acid type polymer aqueous solution, there was gradually added a polyvalent metal compound at normal temperature with stirring until a predetermined ratio was reached. As required, the polyvalent metal compound was adjusted with the deionized water such that a predetermined solid component concentration thereof was reached, and was, thereafter, added to the poly-carboxylic acid type polymer aqueous solution. Further, if the colloidal silica was to be added, an aqueous dispersion solution of the colloidal silica was added, at normal temperature with stirring, to the aqueous solution that contained the poly-carboxylic acid type polymer and the polyvalent metal compound such that a predetermined ratio of the colloidal silica was reached. Next, the deionized water was added with stirring such that the solid component concentration of the poly-carboxylic acid type polymer in the aqueous solution was 0.5 to 1% by mass to thereby obtain a surface-treating solution.

As the poly-carboxylic acid type polymers, there were used poly-acrylic acids (JURYMER AC-10LP, Mw=25,000, produced by Toagosei Co., Ltd. described as PAA1 in Table; JURYMER AC-10LHP, Mw=250,000, described as PAA2 in Table; JURYMER AC-10P, Mw=5,000, described as PAA3 in Table), polymethacrylic acid (Polymethacrylic acid, Mw=100,000, produced by Wako Pure Chemical Industries, Ltd., described as PMA in Table), and polyitaconic acid (PIA-728, Mw=3,000 produced by Iwata Chemical Co., Ltd. described as PIA in Table). As the polyvalent metal compounds, there were used a zirconium compound, a titanium compound and a zinc compound. As the zirconium compound, there was used ammonium zirconyl carbonate (Zircosol AC-7, content=13% by mass calculated as $ZrO_2$, produced by Daiichi Kigenso Kagaku Kogyo Co., Ltd.). As the titanium compound, there was used titanium triethanolaminate (ORGATIX TC-400, content=8.3% by mass calculated as Ti, produced by Matsumoto Fine Chemicals Co., Ltd.). As the zinc compound, there was used zinc oxide (Zinc oxide, 0.02 μm produced by Wako Junyaku Co.). As the colloidal silica, there was used LUDOX AS-30, average grain size=20 nm, content=30% by mass calculated as $SiO_2$, produced by W.R. Grace Co. Table 1 (in the case of cans) and Table 3 (in the case of can lids) show the kinds of the poly-carboxylic acid type polymers and the polyvalent metal compounds that were used, the amounts of the solid components of the polyvalent metal compounds (for the ammonium zirconyl carbonate, the amount of the solid component calculated as $ZrO_2$) per 100 parts of the solid component of the poly-carboxylic acid polymer in the surface-treating solution, the amounts of the polyvalent metal compounds calculated as metal, and the amounts of the solid component of the colloidal silica calculated as the silicon dioxide ($SiO_2$).

(Preparation of the Surface-Treated Metal Sheets)

As a metal sheet, there was used an aluminum sheet (alloy 3104 sheet, thickness: 0.28 mm, sheet size: 200×300 mm in the case of a can body; alloy 5182 sheet, thickness: 0.28 mm, sheet size: 200×300 mm in the case of a can lid). First, the metal sheet was dipped in an aqueous solution (60° C.) containing 2% of the Alkaline Cleaner (Surf-Cleaner 420N-2, trade name, produced by Nihon Paint Co.) for 6 seconds to wash it with the alkali. After washed with the alkali, the metal sheet was washed with water, dipped in an aqueous solution (60° C.) containing 2% of sulfuric acid for 6 seconds to wash it with the acid followed by washing with water and drying. The surface-treating solution was applied onto both surfaces of the metal sheet which was then held in an oven set at 150° C. for 60 seconds and was dried to obtain a surface-treated metal sheet for producing can bodies and can lids.

(Measuring the Contents).

Contents (mg/m$^2$), per a unit area, of carbon due to the poly-carboxylic acid type polymer in the surface-treatment coating on the surface-treated metal sheet obtained above, polyvalent metals (zirconium, titanium, zinc) due to the polyvalent metal compounds, and silicon due to the colloidal silica, were measured by using an X-ray fluorometric analyzer. Measurements were first taken from a plurality of samples containing carbon, polyvalent metals (zirconium, titanium, zinc) and silicon in known but different amounts. From the intensities that were measured, there were drawn calibration curves of intensities vs. contents. Under the same conditions, surface-treated metal sheets of Examples were also measured, and the measured intensities were converted into the contents based on the calibration curves to thereby find the contents of carbon, polyvalent metals (zirconium, titanium, zinc) and silicon in the surface-treatment coating. The measured contents of carbon (C), polyvalent metals (zirconium: Zr, titanium: Ti, zinc: Zn) and silicon (Si) were as shown in Table 1 in the case of can bodies and Table 3 in the case of can lids.

Equipment used: ZSX100e manufactured by Rigaku Co.
Measuring conditions: measuring diameter, 20 mm,
X-ray output, 50 kV-70 mA (Preparation of the Organic Resin-Covered Surface-Treated Metal Sheets)

The organic resin-covered surface-treated sheets for can bodies were prepared by a method described below. The obtained surface-treated metal sheet was pre-heated at a temperature of 250° C., and a polyester resin film was adhered as the organic resin film onto both surfaces of the surface-treated metal sheet with the application of heat and pressure via laminate rolls followed immediately by cooling with water to thereby obtain an organic resin-covered surface-treated metal sheet for producing can bodies. As the polyester resin film on the inner surface of the can, there was used a polyethylene terephthalate/polyethylene isophthalate copolymer resin film of a thickness of 12 μm. As the organic resin film on the outer surface of the can, there was used a polyethylene terephthalate/polyethylene isophthalate copolymer resin film of a thickness of 12 μm or a blended resin film (PET/IA• PBT) of polyethylene terephthalate/polyethylene isophthalate copolymer resin and polybutylene terephthalate resin of a thickness of 12 μm. Table 1 shows the kinds of the organic resin films on the outer surfaces in Examples.

The organic resin-covered surface-treated metal sheet for can lids were prepared by methods described below depending on if the organic resin film was a coating or was a thermoplastic resin film.

If the organic resin film was a coating, the epoxyacrylic coating material or the polyester coating material was applied on the surface-treated metal sheet that became the inner surface of the lid in such an amount that the mass of the coating after dried became 60 mg/dm$^2$, and the epoxyacrylic coating material was applied onto the surface-treated metal sheet that became the outer surface of the lid in such an amount that the mass of the coating after dried became 50 mg/dm$^2$. The surface-treated metal sheet was, thereafter, held in an oven set at 250° C. for 70 seconds so as to be fired to thereby obtain an organic resin-covered surface-treated metal sheet having the organic resin film.

If the organic resin film was a thermoplastic resin film, the surface-treated metal sheet was, first, pre-heated at a temperature of 265° C. Next, a 30 μm-thick stretched polyester resin film (polyethylene terephthalate/polyethylene isophthalate copolymer resin) applied with an epoxyphenol type adhesive primer in a thickness of 1 μm, was heat-laminated on one surface of the surface-treated metal sheet via laminate rolls such that the surface applied with the primer was on the side of the metal sheet, followed immediately by cooling with water to thereby prepare a sheet having a laminate on one surface thereof. Next, an epoxyurea coating material was applied onto the surface opposite to the surface on where the laminate was formed of the metal sheet, such that the thickness of the coating thereof after dried was 3 μm. The metal sheet was then held in an oven set at 185° C. for 10 minutes to effect the firing. The organic resin-covered surface-treated metal sheet for can lids was thus prepared. Table 3 shows the kinds of the organic resin films on the inner surfaces in Examples.

(Production of the Seamless Cans)

A paraffin wax was electrostatically applied to both surfaces of the organic resin-covered surface-treated metal sheet for producing can bodies, and the metal sheet was punched in a circular shape 156 mm in diameter to form a shallowly drawn cup. Next, the shallowly drawn cup was subjected to the redraw-ironing working and doming, then trimming the edge of the opening, and was, further, subjected to the heat treatment at 201° C. for 75 seconds and, thereafter, at 210° C. for 80 seconds. The open end was subjected to the necking and flanging, and there was obtained a seamless can of a capacity of 500 ml having a diameter of 211 mm at the body wall and a diameter of 206 mm at the neck portion. The seamless can possessed the following characteristics:

Diameter of can body: 66 mm
Height of can body: 168 mm
Average thickness reduction ratio of the can side wall relative to the initial sheet thickness: 60%

(Production of the Can Lids)

The organic resin-covered surface-treated metal sheet for producing can lids was punched into a diameter of 68.7 mm. Next, the outer surface side of the lid was subjected to the scoring (width of 22 mm, remaining thickness of score of 110 μm, score width of 20 μm) in the shape of a partial opening, and to the riveting. Next, a tab for opening was attached thereby to prepare an easy open lid.

[Measuring the Peak Height Ratios ($\beta/\alpha$)]

The peak height ratios ($\beta/\alpha$) in the surface-treatment coatings in Examples were measured by a method described below.

In the case of the organic resin-covered surface-treated metal sheet for can bodies, the organic resin-covered surface-treated metal sheet was prepared as described in the paragraph of "Preparation of the organic resin-covered surface-treated metal sheets". The organic resin-covered surface-treated metal sheet cut into a size of 8 cm×6 cm was dipped in 300 mL of a 1,1,1,3,3,3-hexafluoro-2-propanol (HFIP) at normal temperature for one hour so that the organic resin film (polyester resin film) was dissolved and removed. The metal sheet was taken out from the HFIP, the HFIP adhered on the metal sheet was removed, and a sample for measurement was thus obtained. Next, the surface of the sample (surface on where the surface-treatment coating has been formed) was measured for its infrared ray-absorption spectra. Absorption peaks of the water vapor and the carbonic acid gas were subtracted from the infrared ray-absorption spectra of the surface-treated film. From the resulting infrared ray-absorption spectra, the peak height ratio ($\beta/\alpha$) of the surface-treatment coating was calculated according to the method described in the paragraph of "Calculating the peak height ratio ($\beta/\alpha$)". From the thus obtained peak height ratio ($\beta/\alpha$), further, the crosslinking ratio was calculated according to the formula (1) described in the above-mentioned paragraph of "Surface-treatment coating". The results of the peak height ratios ($\beta/\alpha$) and the crosslinking ratios were as shown in Table 1.

In the case of the organic resin-covered seamless can, the seamless can was prepared as described in the paragraph of "Preparation of the seamless cans". The body wall of the obtained seamless can was cut into a size of 8 cm×4 cm to use it as a sample. The sample was dipped in 300 mL of the 1,1,1,3,3,3-hexafluoro-2-propanol (HFIP) at normal temperature for one hour so that the organic resin film (polyester resin film) was dissolved and removed. The sample was taken out from the HFIP, the HFIP adhered on the sample was removed, and the sample for measurement was thus obtained. Next, the surface (surface-treatment coating) of the sample was measured for its infrared ray-absorption spectra. Absorption peaks of the water vapor and the carbonic acid gas were subtracted from the infrared ray-absorption spectra of the surface-treated film. From the resulting infrared ray-absorption spectra, the peak height ratio ($\beta/\alpha$) of the surface-treatment coating was calculated according to the method described in the paragraph of "Calculating the peak height ratios ($\beta/\alpha$)". The results of the peak height ratios ($\beta/\alpha$) were as shown in Table 2.

In the case of the surface-treated metal sheet for producing can lids, the surface-treated metal sheet for can lids was prepared as described in the paragraph of "Preparation of the surface-treated metal sheets". The surface-treated metal sheet cut into a size of 8 cm×6 cm was used as a sample for measurement. The surface of the sample (surface on where the surface-treatment coating has been formed) was measured for its infrared ray-absorption spectra. Absorption peaks of the water vapor and the carbonic acid gas were subtracted from the infrared ray-absorption spectra of the surface-treated film. From the resulting infrared ray-absorption spectra, the peak height ratio ($\beta/\alpha$) of the surface-treatment coating was calculated according to the method described in the paragraph of "Calculating the peak height ratios ($\beta/\alpha$)". From the thus obtained peak height ratio ($\beta/\alpha$), further, the crosslinking ratio was calculated according to the formula (1) described in the above-mentioned paragraph of "Surface-treatment coating". The results of the peak height ratios ($\beta/\alpha$) and the crosslinking ratios were as shown in Table 3.

Equipment used: FTS 7000 Series manufactured by Digilab Co.
    Detector used: MCT detector
    Accessory used: Advanced Grazing Angle (AGA) manufactured by PIKE Co.
    Measuring method: High sensitivity reflection method (incident angle: 80 deg., number of integration: 100 times, reference substrate: gold-deposited mirror, polarizer is used to detect parallel polarization only)
    Region of measuring wave numbers: 4000 to 700 cm$^{-1}$ Comparative Example 4

As the metal sheet, there was used an aluminum sheet treated for its surface with chromic-phosphate process (conversion-treated) (alloy 3104 sheet, thickness: 0.28 mm, sheet size: 200×300 mm, chromium content in the surface-treatment coating: 20 mg/m$^2$) to prepare an organic resin-covered surface-treated metal sheet as described in the paragraph of "Preparation of the organic resin-covered surface-treated metal sheets", and from which a seamless can was produced as described in the paragraph of "Preparation of the seamless cans".

(Evaluating the Can Bodies)

The can bodies obtained in Examples 1 to 26 and Comparative Examples 1 to 4 were evaluated as described below. The results were as shown in Table 2.

[Evaluating the Peeling at the Flange Portion During the Heat Treatment (Evaluating the Adaptability to Producing Cans)]

For evaluating the peeling at the flange portion during the heat treatment, the can body was treated up to the trimming as described in the paragraph of "Preparation of the seamless cans". Thereafter, by using an oven, the can was heat-treated at 201° C. for 75 seconds and, thereafter, at 210° C. for 80 seconds. The open end (flange-forming portion) of the can body was observed by using a microscope, and a degree the organic resin film was peeling from the open end of the can body was evaluated. Table 2 shows the results of evaluation.

⊚: A maximum length of the peeled portion wass less than 0.05 mm.
    ◯: A maximum length of the peeled portion was not less than 0.05 mm but was less than 0.1 mm.
    Δ: A maximum length of the peeled portion was not less than 0.1 mm but was less than 0.2 mm.
    X: A maximum length of the peeled portion was not less than 0.2 mm.

[Evaluating the Peeling at the Flange Portion During the Treatment with Hot Water]

For evaluating the peeling at the flange portion during the treatment with hot water, the seamless can was produced as described in the paragraph of "Preparation of the seamless cans". Thereafter, by using a cutter knife, a scar was formed in the inner surface of the neck portion at the smallest diameter portion along the circumference of the can deep enough to reach the metal surface. In this state, the can was dipped in hot water of 100° C. for 10 minutes to observe and evaluate the peeling of the organic resin film at the neck portion. The results of evaluation were as shown in Table 2.

⊚: No peeling was recognized over the whole circumference.
    ◯: Peeling was recognized partly but its length was less than 10% of the whole circumference of the can.
    Δ: Peeling was recognized partly but its length was not less than 10% but was less than 20% of the whole circumference of the can.
    X: The length of the peeling portion was not less than 20% of the whole circumference.

[Evaluating the Peeling at the Flange Portion During the Retort Treatment]

The seamless can was produced as described in the paragraph of "Preparation of the seamless cans" and was evaluated for its peeling at the flange portion during the retort treatment in a manner as described below. First, the obtained can was arranged upright (can bottom was on the lower side) in a retort oven and was sterilized by the application of pressure and heat of steam of 125° C. for 30 minutes in the closed retort oven. After the sterilization treatment by the pressure and heat, the seamless can was cooled down to room temperature, taken out from the retort oven, and was observed and evaluated for its peeling of the organic resin film at the flange portion on the inner and outer surfaces of the can. The results of evaluation were as shown in Table 2.

⊚: No peeling was recognized over the whole circumference.

○: Peeling was recognized partly but its length was less than 5% of the whole circumference of the can.

Δ: Peeling was recognized partly but its length was not less than 5% but was less than 10% of the whole circumference of the can.

X: The length of the peeling portion was not less than 10% of the whole circumference.

[Evaluating the Appearance of the Side Wall of the Can Body During the Retort Treatment]

The seamless can was produced as described in the paragraph of "Preparation of the seamless cans" and was evaluated for its appearance of the side wall of the can body during the retort treatment in a manner as described below. First, the obtained can was filled with 500 g of water and was wrap-seamed with the lid in a customary manner to obtain a packed can. The obtained packed can was dipped in water, put into a stainless steel case in a state where the side wall of the can body which is the outer surface of the can was sufficiently wet. The stainless steel case containing therein the packed can laid down sideways (body wall was on the lower side) was left to stand in the retort oven, and was sterilized by the application of pressure and heat of steam of 130° C. for 5 minutes in the closed retort oven in a state where the lower side of the body wall (portion in contact with the stainless steel case) was in contact with water. After the sterilization treatment by the pressure and heat, the packed can was cooled down to room temperature, taken out from the retort oven, and was observed with the eye and evaluated for the occurrence of floating and swelling (blistering) of the organic resin film on the side wall of the can body on the outer surface of the can.

⊚: Occurrence of blistering was not at all recognized.

○: Occurrence of blistering was not almost recognized.

Δ: Occurrence of blistering was partly recognized.

X: Blistered conspicuously.

(Evaluating the Can Lids)

Can lids obtained in Examples 27 to 29 were evaluated as described below. The results were as shown in Table 3.

[Evaluating the Feathering]

To evaluate the feathering, easy-open lids were produced as described in the above-mentioned paragraph of "Production of the can lids". The obtained easy open-lids were subjected to the retort sterilization treatment (at 125° C. for 30 minutes). Thereafter, the can lids were opened to evaluate the occurrence of feathering at the opening portion. The lids were evaluated in a number of n=50. An average length of feathering of 50 lids was calculated based on maximum lengths of feathering of the lids. The feathering was evaluated on the following basis. The results were as shown in Table 3.

○: Average length of feathering was less than 1.0 mm.

X: Average length of feathering was not less than 1.0 mm.

[Evaluating the Openability]

To evaluate the openability, the easy-open lids were produced as described in the above-mentioned paragraph of "Production of the can lids". The obtained easy-open lids were subjected to the retort sterilization treatment (at 125° C. for 30 minutes). Thereafter, the can lids were evaluated for their openability. The lids were evaluated in a number of n=50. The results of evaluation were represented by the number of the defective openings due to broken tabs/number of the openings as shown in Table 3.

TABLE 1

| | Composition of the surface-treating solution | | | | | |
|---|---|---|---|---|---|---|
| | Poly-carboxylic acid type polymer | | Polyvalent metal compound | | | Colloidal silica |
| | Kind | Amount of solid Component (pts) | Kind | Amount of solid Component (pts) | Amount calculated as metal (pts) | Amount of solid component (pts) |
| Ex. 1 | PAA1 | 100 | *1 | 50 | 37.0 | 0 |
| Ex. 2 | PAA1 | 100 | " | 5 | 3.7 | 0 |
| Ex. 3 | PAA1 | 100 | " | 10 | 7.4 | 0 |
| Ex. 4 | PAA1 | 100 | " | 20 | 14.8 | 0 |
| Ex. 5 | PAA1 | 100 | " | 23 | 17.0 | 0 |
| Ex. 6 | PAA1 | 100 | " | 25 | 18.5 | 0 |
| Ex. 7 | PAA1 | 100 | " | 30 | 22.2 | 0 |
| Ex. 8 | PAA1 | 100 | " | 40 | 30.0 | 0 |
| Ex. 9 | PAA1 | 100 | " | 60 | 44.4 | 0 |
| Ex. 10 | PAA1 | 100 | " | 65 | 48.0 | 0 |
| Ex. 11 | PAA1 | 100 | " | 70 | 51.8 | 0 |
| Ex. 12 | PAA1 | 100 | " | 80 | 59.2 | 0 |
| Ex. 13 | PAA1 | 100 | " | 90 | 66.6 | 0 |
| Ex. 14 | PAA2 | 100 | " | 50 | 37.0 | 0 |
| Ex. 15 | PAA3 | 100 | " | 50 | 37.0 | 0 |
| Ex. 16 | PMA | 100 | " | 50 | 37.0 | 0 |
| Ex. 17 | PIA | 100 | " | 50 | 37.0 | 0 |
| Ex. 18 | PAA1 | 100 | *2 | — | 40.0 | 0 |
| Ex. 19 | PAA3 | 100 | *3 | 25 | 20.0 | 0 |
| Ex. 20 | PAA1 | 100 | *1 | 50 | 37.0 | 0 |
| Ex. 21 | PAA1 | 100 | " | 50 | 37.0 | 0 |
| Ex. 22 | PAA1 | 100 | " | 50 | 37.0 | 0 |
| Ex. 23 | PAA1 | 100 | " | 50 | 37.0 | 0 |
| Ex. 24 | PAA1 | 100 | " | 50 | 37.0 | 50 |

TABLE 1-continued

| | | | | | | |
|---|---|---|---|---|---|---|
| Ex. 25 | PAA1 | 100 | " | 50 | 37.0 | 100 |
| Ex. 26 | PAA1 | 100 | " | 50 | 37.0 | 0 |
| Comp. Ex. 1 | PAA1 | 100 | none | 0 | 0 | 0 |
| Comp. Ex. 2 | PAA1 | 100 | *1 | 3 | 2.2 | 0 |
| Comp. Ex. 3 | PAA1 | 100 | " | 100 | 74.0 | 0 |
| Comp. Ex. 4 | treated with chromate phosphate | | | | | |

| | Content per a unit area (mg/m$^2$) | | | Peak height ratio (β/α) of org. resin-coated surface treated metal sheet | Crosslinking ratio (%) | Organic resin coating (outer surface) |
|---|---|---|---|---|---|---|
| | Carbon (C) | Polyvalent metal | Silicon (Si) | | | |
| Ex. 1 | 35 | Zr: 17 | 0 | 1.00 | 50 | PET/IA |
| Ex. 2 | 34 | Zr: 2 | 0 | 0.10 | 9 | " |
| Ex. 3 | 34 | Zr: 4 | 0 | 0.23 | 19 | " |
| Ex. 4 | 35 | Zr: 7 | 0 | 0.37 | 27 | " |
| Ex. 5 | 34 | Zr: 8 | 0 | 0.41 | 29 | " |
| Ex. 6 | 37 | Zr: 10 | 0 | 0.47 | 32 | " |
| Ex. 7 | 39 | Zr: 13 | 0 | 0.58 | 37 | " |
| Ex. 8 | 39 | Zr: 16 | 0 | 0.75 | 43 | " |
| Ex. 9 | 34 | Zr: 19 | 0 | 1.26 | 56 | " |
| Ex. 10 | 34 | Zr: 21 | 0 | 1.48 | 60 | " |
| Ex. 11 | 35 | Zr: 23 | 0 | 1.60 | 62 | " |
| Ex. 12 | 36 | Zr: 27 | 0 | 1.94 | 66 | " |
| Ex. 13 | 38 | Zr: 31 | 0 | 2.25 | 69 | " |
| Ex. 14 | 29 | Zr: 14 | 0 | 0.96 | 49 | " |
| Ex. 15 | 34 | Zr: 17 | 0 | 1.01 | 50 | " |
| Ex. 16 | 35 | Zr: 22 | 0 | 0.86 | 46 | " |
| Ex. 17 | 32 | Zr: 23 | 0 | 1.14 | 53 | " |
| Ex. 18 | 33 | Ti: 18 | 0 | 1.51 | 60 | PET/IA |
| Ex. 19 | 38 | Zn: 10 | 0 | 0.47 | 32 | " |
| Ex. 20 | 85 | Zr: 41 | 0 | 0.92 | 48 | " |
| Ex. 21 | 21 | Zr: 10 | 0 | 1.04 | 51 | " |
| Ex. 22 | 12 | Zr: 6 | 0 | 0.98 | 50 | " |
| Ex. 23 | 10 | Zr: 5 | 0 | 1.03 | 51 | " |
| Ex. 24 | 35 | Zr: 17 | 16 | 1.08 | 52 | " |
| Ex. 25 | 34 | Zr: 17 | 35 | 0.99 | 50 | " |
| Ex. 26 | 35 | Zr: 17 | 0 | 1.03 | 50 | PET/IA•PBT |
| Comp. Ex. 1 | 33 | 0 | 0 | 0.01 | 1 | " |
| Comp. Ex. 2 | 33 | Zr: 1 | 0 | 0.04 | 4 | " |
| Comp. Ex. 3 | 36 | Zr: 32 | 0 | 2.54 | 72 | " |
| Comp. Ex. 4 | | Cr: 20 | | — | — | " |

*1: ammonium zirconyl carbonate,
*2: titanium triethanolaminate,
*3: zinc oxide

TABLE 2

| | Evaluation of can body | | | | |
|---|---|---|---|---|---|
| | *1 | *2 | *3 | *4 | 5* |
| Ex. 1 | 1.00 | ○ | ◎ | ◎ | ◎ |
| Ex. 2 | 0.10 | Δ | Δ | Δ | Δ |
| Ex. 3 | 0.23 | Δ | ○ | ○ | Δ |
| Ex. 4 | 0.37 | Δ | ○ | ○ | ○ |
| Ex. 5 | 0.41 | Δ | ○ | ○ | ○ |
| Ex. 6 | 0.47 | ○ | ◎ | ○ | ○ |
| Ex. 7 | 0.58 | ○ | ◎ | ◎ | ○ |
| Ex. 8 | 0.78 | ○ | ◎ | ◎ | ◎ |
| Ex. 9 | 1.26 | ○ | ◎ | ◎ | ◎ |
| Ex. 10 | 1.45 | ○ | ◎ | ◎ | ◎ |
| Ex. 11 | 1.60 | ○ | ○ | ○ | ○ |
| Ex. 12 | 1.94 | ○ | Δ | ○ | Δ |
| Ex. 13 | 2.25 | ○ | Δ | Δ | Δ |
| Ex. 14 | 0.96 | ○ | ◎ | ◎ | ◎ |
| Ex. 15 | 1.01 | ○ | ○ | ○ | Δ |
| Ex. 16 | 0.86 | ○ | ◎ | ◎ | ◎ |
| Ex. 17 | 1.14 | ○ | ○ | ○ | Δ |
| Ex. 18 | 1.51 | ○ | ○ | ○ | Δ |
| Ex. 19 | 0.47 | ○ | ○ | Δ | Δ |
| Ex. 20 | 0.92 | ○ | ◎ | ◎ | ◎ |
| Ex. 21 | 1.04 | ○ | ◎ | ◎ | ◎ |
| Ex. 22 | 0.99 | ○ | ○ | ○ | ○ |
| Ex. 23 | 1.03 | ○ | Δ | Δ | Δ |
| Ex. 24 | 1.08 | ◎ | ◎ | ◎ | ◎ |
| Ex. 25 | 0.99 | ◎ | ◎ | ◎ | ◎ |
| Ex. 26 | 1.01 | ○ | ◎ | ◎ | ◎ |
| Comp. Ex. 1 | 0.01 | X | Δ | X | X |
| Comp. Ex. 2 | 0.04 | X | Δ | Δ | x |
| Comp. Ex. 3 | 2.54 | ○ | X | X | X |
| Comp. Ex. 4 | — | ◎ | ○ | ○ | ○ |

*1: Peak height ratio (β/α) of seamless can
*2: Peeling at flange during the heat treatment
*3: Peeling at flange during the hot water treatment
*4: Peeling at flange during the retort treatment
*5: Appearance of side wall of can body during the retort treatment

TABLE 3

| | Composition of the surface-treating solution | | | | |
|---|---|---|---|---|---|
| | Poly-carboxylic acid type polymer | | Polyvalent metal compound | | |
| | Kind | Amount of solid component (pts) | Kind | Amount of solid component (pts) | Amount calculated as metal (pts) |
| Ex. 27 | PAA1 | 100 | ammonium zirconyl carbonate | 50 | 37 |
| Ex. 28 | PAA1 | 100 | ammonium zirconyl carbonate | 50 | 37 |
| Ex. 29 | PAA1 | 100 | ammonium zirconyl carbonate | 50 | 37 |

| | Amount of film (mg/m$^2$) | | Peak height ratio ($\beta/\alpha$) | Crosslinking ratio (%) | Organic resin coating *(inner surface of lid) | Evaluation of lid | |
|---|---|---|---|---|---|---|---|
| | Carbon (C) | Polyvalent metal | | | | Feathering | Openability |
| Ex. 27 | 31 | Zr: 15 | 0.98 | 50 | A | ○ | 0/50 |
| Ex. 28 | 31 | Zr: 15 | 0.98 | 50 | B | ○ | 0/50 |
| Ex. 29 | 31 | Zr: 15 | 0.98 | 50 | C | ○ | 0/50 |

*A: Epoxyacrylic type coating material
B: Polyester type coating material
C: Stretched polyester resin film (applied with epoxyphenol type adhesive primer)

INDUSTRIAL APPLICABILITY

The organic resin-covered surface-treated metal sheet of the present invention, when the seamless cans are formed therefrom, exhibits excellent adaptability to producing cans suppressing the organic resin film from peeling at the flange-forming portion even at the time of the heat treatment executed after the can body has been formed. Even when subjected to the treatment under high-temperature and highly wet environment such as the step of sterilization, the organic resin-covered surface-treated metal sheet of the present invention exhibits excellent hot water-resistant adhering property preventing the organic resin film from peeling and suppressing the occurrence of defects such as blistering on the outer surface, and can be favorably used for producing can bodies and can lids. Besides, even when subjected to severe forming, the organic resin-covered surface-treated metal sheet maintains excellent hot water-resistant adhering property lending itself well suited for producing, specifically, seamless cans such as draw-ironed cans.

DESCRIPTION OF REFERENCE NUMERALS 1 organic resin-covered surface-treated metal sheet
2 metal sheet
3 surface-treatment coating
4 organic resin film

The invention claimed is:

1. An organic resin-covered surface-treated metal sheet forming, on at least one surface of a metal sheet, a surface-treatment coating and an organic resin film on said surface-treatment coating, wherein:
    said surface-treatment coating contains a polycarboxylic acid polymer and a polyvalent metal compound;
    said polycarboxylic acid polymer consists of at least one polymerizable monomer selected from acrylic acid, maleic acid, methacrylic acid, and itaconic acid;
    said polyvalent metal compound is a zirconium compound containing no fluorine component and derived from a water-soluble oxyzirconium salt; and
    said surface-treatment coating exhibits an infrared-ray absorption spectra having a peak height ratio ($\beta/\alpha$) of a maximum absorption peak height ($\alpha$) in a wave number range of 1660 to 1760 cm$^{-1}$ and a maximum absorption peak height ($\beta$) in a wave number range of 1490 to 1659 cm$^{-1}$ of from 0.37 to 2.40.

2. The organic resin-covered surface-treated metal sheet according to claim 1, wherein said peak height ratio ($\beta/\alpha$) is from 0.75 to 1.48.

3. The organic resin-covered surface-treated metal sheet according to claim 1, wherein the content of said polycarboxylic acid polymer in said surface-treatment coating is 12 to 100 mg/m$^2$ calculated as carbon, and the content of said polyvalent metal is 2 to 80 mg/m$^2$ calculated as polyvalent metal element.

4. The organic resin-covered surface-treated metal sheet according to claim 1, wherein said surface-treatment coating contains the polyvalent metal compound in an amount of 3 to 67 parts by weight calculated as metal per 100 parts by weight of the solid component of the poly-carboxylic acid type polymer.

5. The organic resin-covered surface-treated metal sheet according to claim 1, wherein said surface-treatment coating further contains colloidal silica.

6. The organic resin-covered surface-treated metal sheet according to claim 5, wherein the content of said colloidal silica in said surface-treatment coating is 5 to 200 mg/m$^2$ calculated as silicon.

7. The organic resin-covered surface-treated metal sheet according to claim 1, wherein said organic resin film is a polyester resin film.

8. The organic resin-covered surface-treated metal sheet according to claim 1, wherein said metal sheet is an aluminum sheet.

9. A can body made from the organic resin-covered surface-treated metal sheet of claim 1.

10. The can body according to claim 9, wherein the can body is an organic resin-covered seamless can made from the organic resin-covered surface-treated metal sheet; and the surface-treatment coating of said organic resin-covered seamless can exhibits an infrared-ray absorption spectra having a peak height ratio ($\beta/\alpha$) of a maximum absorption peak height ($\alpha$) in a wave number range of 1660 to 1760 cm$^{-1}$ and a maximum absorption peak height ($\beta$) in a wave number range of 1490 to 1659 cm$^{-1}$ of from 0.10 to 2.35.

11. An organic resin-covered seamless can forming, on at least one surface of an aluminum base material, a surface-treatment coating and an organic resin film comprising a polyester resin film on said surface-treatment coating, wherein:

said surface-treatment coating contains a polycarboxylic acid polymer and a polyvalent metal compound;

said polycarboxylic acid polymer consists of at least one polymerizable monomer selected from acrylic acid, maleic acid, methacrylic acid, and itaconic acid;

said polyvalent metal compound is a zirconium compound containing no fluorine component and derived from a water-soluble oxyzirconium salt; and said surface-treatment coating exhibits an infrared-ray absorption spectra having a peak height ratio ($\beta/\alpha$) of a maximum absorption peak height ($\alpha$) in a wave number range of 1660 to 1760 cm$^{-1}$ and a maximum absorption peak height ($\beta$) in a wave number range of 1490 to 1659 cm$^{-1}$ of from 0.78 to 1.45.

12. A can lid made from the organic resin-covered surface-treated metal sheet of claim 1.

* * * * *